United States Patent
Liu et al.

(10) Patent No.: US 11,775,692 B2
(45) Date of Patent: Oct. 3, 2023

(54) METHOD AND SYSTEM FOR ENCRYPTING DATA USING A KERNEL

(71) Applicants: Baidu USA LLC, Sunnyvale, CA (US); KUNLUNXIN TECHNOLOGY (BEIJING) COMPANY LIMITED, Beijing (CN)

(72) Inventors: Yong Liu, Sunnyvale, CA (US); Yueqiang Cheng, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

(*) Notice: Subject to any disclaimer, the term of this patent is extended or adjusted under 35 U.S.C. 154(b) by 185 days.

(21) Appl. No.: 16/598,428

(22) Filed: Oct. 10, 2019

(65) Prior Publication Data

US 2021/0110066 A1   Apr. 15, 2021

(51) Int. Cl.
*G06F 21/74*   (2013.01)
*H04L 9/08*   (2006.01)
*G06F 21/53*   (2013.01)
*G06F 21/72*   (2013.01)

(52) U.S. Cl.
CPC ............ *G06F 21/74* (2013.01); *G06F 21/53* (2013.01); *G06F 21/72* (2013.01); *H04L 9/0838* (2013.01)

(58) Field of Classification Search
CPC .......... G06F 21/53; G06F 21/72; G06F 21/74; G06F 21/51; G06F 21/71; H04L 9/0838; H04L 9/0816
See application file for complete search history.

(56) References Cited

U.S. PATENT DOCUMENTS

| | | |
|---|---|---|
| 7,222,235 B1 | 5/2007 | Mitsui |
| 9,195,851 B1 | 11/2015 | Chandra |
| 10,200,196 B1 | 2/2019 | Rodriguez De Castro |
| 2002/0087881 A1 | 7/2002 | Harif |
| 2002/0146128 A1 | 10/2002 | Mauro et al. |
| 2005/0132195 A1 | 6/2005 | Dietl |
| 2006/0136723 A1 | 6/2006 | Taylor |
| 2008/0109903 A1 | 5/2008 | Werner et al. |
| 2009/0097657 A1 | 4/2009 | Scheldt et al. |

(Continued)

FOREIGN PATENT DOCUMENTS

| | | |
|---|---|---|
| CN | 108363929 A | 8/2018 |
| GB | 2586065 A | 2/2021 |

(Continued)

*Primary Examiner* — D'Arcy Winston Straub
(74) *Attorney, Agent, or Firm* — WOMBLE BOND DICKINSON (US) LLP

(57) ABSTRACT

In one embodiment, a computer-implemented method of a data processing (DP) accelerator encrypting or decrypting input data can include receiving, from a host device, a command, the input data, and a kernel. The kernel can be an encryption kernel, or a decryption kernel, and the DP accelerator need not know which kernel it has received. The DP accelerator runs the received kernel. In response to the DP accelerator receiving the command, the DP accelerator performs encrypting of the input data using the kernel, if the received kernel is an encryption kernel, otherwise, decrypting the input data using the kernel. The encrypted, or decrypted, input data is then provided to the host device.

20 Claims, 14 Drawing Sheets

(56) References Cited

U.S. PATENT DOCUMENTS

| | | | |
|---|---|---|---|
| 2009/0119503 A1* | 5/2009 | Isaakian | G06F 21/572 |
| | | | 713/153 |
| 2010/0254537 A1 | 10/2010 | Buer et al. | |
| 2011/0225431 A1* | 9/2011 | Stufflebeam, Jr. | G06F 21/62 |
| | | | 713/190 |
| 2013/0326602 A1 | 12/2013 | Chen | |
| 2016/0234176 A1 | 8/2016 | Chu | |
| 2016/0267558 A1 | 9/2016 | Bonnell et al. | |
| 2018/0285600 A1* | 10/2018 | Hunt | H04L 9/0643 |
| 2019/0042765 A1 | 2/2019 | Chung et al. | |
| 2019/0095757 A1 | 3/2019 | Sugiura et al. | |
| 2019/0114538 A1 | 4/2019 | Ng et al. | |
| 2019/0130120 A1* | 5/2019 | Lal | H04L 9/0631 |
| 2019/0273607 A1 | 9/2019 | Van Der Velden et al. | |
| 2019/0363880 A1 | 11/2019 | Lee et al. | |
| 2020/0007519 A1 | 1/2020 | Thorpe et al. | |
| 2020/0019857 A1 | 1/2020 | Wang et al. | |
| 2020/0193274 A1 | 6/2020 | Darvish Rouhani et al. | |
| 2020/0380145 A1 | 12/2020 | Van Oldenborgh | |
| 2021/0019605 A1 | 1/2021 | Rouhani et al. | |
| 2021/0034788 A1* | 2/2021 | Savagaonkar | H04L 63/0428 |

FOREIGN PATENT DOCUMENTS

| | | |
|---|---|---|
| WO | 2005060152 A1 | 6/2005 |
| WO | 2020142110 A1 | 7/2020 |

\* cited by examiner

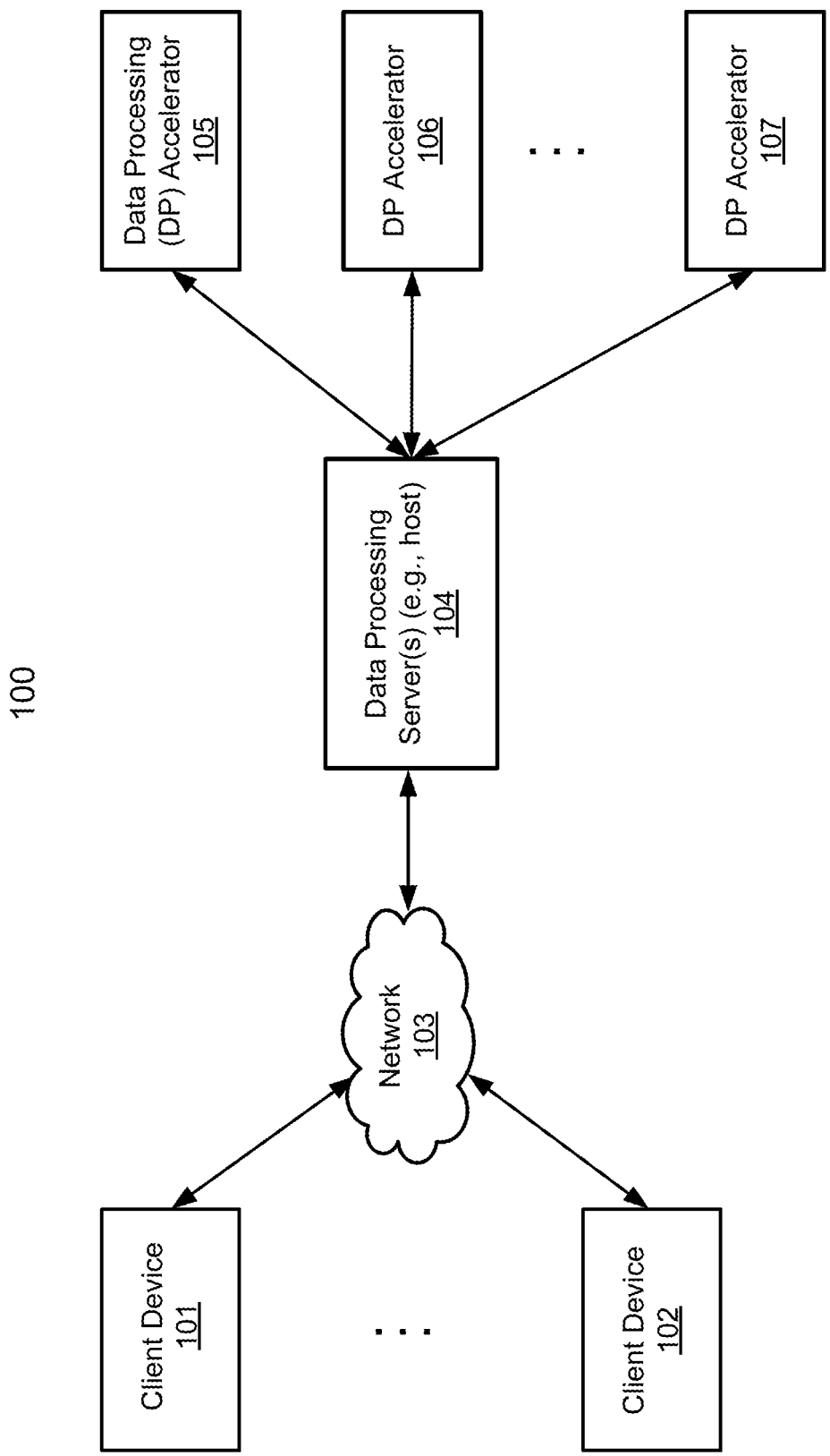

METHOD AND SYSTEM FOR ENCRYPTING DATA USING A KERNEL

TECHNICAL FIELD

Embodiments of the present disclosure relate generally to artificial intelligence model training and inference. More particularly, embodiments of the disclosure relate to artificial intelligence model training and inference and the associated security performed by data processing accelerators.

BACKGROUND

Artificial intelligence (AI) models (also termed, "machine learning models") have been widely utilized recently as AI technology has been deployed in a variety of fields such as image classification or autonomous driving. Similar to an executable image or binary image of a software application, an AI model, when trained, can perform an inference based on a set of attributes to classify as features. As a result, an AI model can be "portable" and utilized without authorization. Currently there has been a lack of effective digital rights protection for AI models. In addition, a processing task using an AI model delegated to a secondary processing system, such as a processing (DP) accelerator or remote system, there has been lack of proof that the results produced by the DP accelerator system are protected by a "root of trust" system.

BRIEF DESCRIPTION OF THE DRAWINGS

Embodiments of the disclosure are illustrated by way of example and not limitation in the figures of the accompanying drawings in which like references indicate similar elements.

FIG. 1 is a block diagram illustrating a secure processing system, according to one embodiment.

DETAILED DESCRIPTION

Figure 2A:
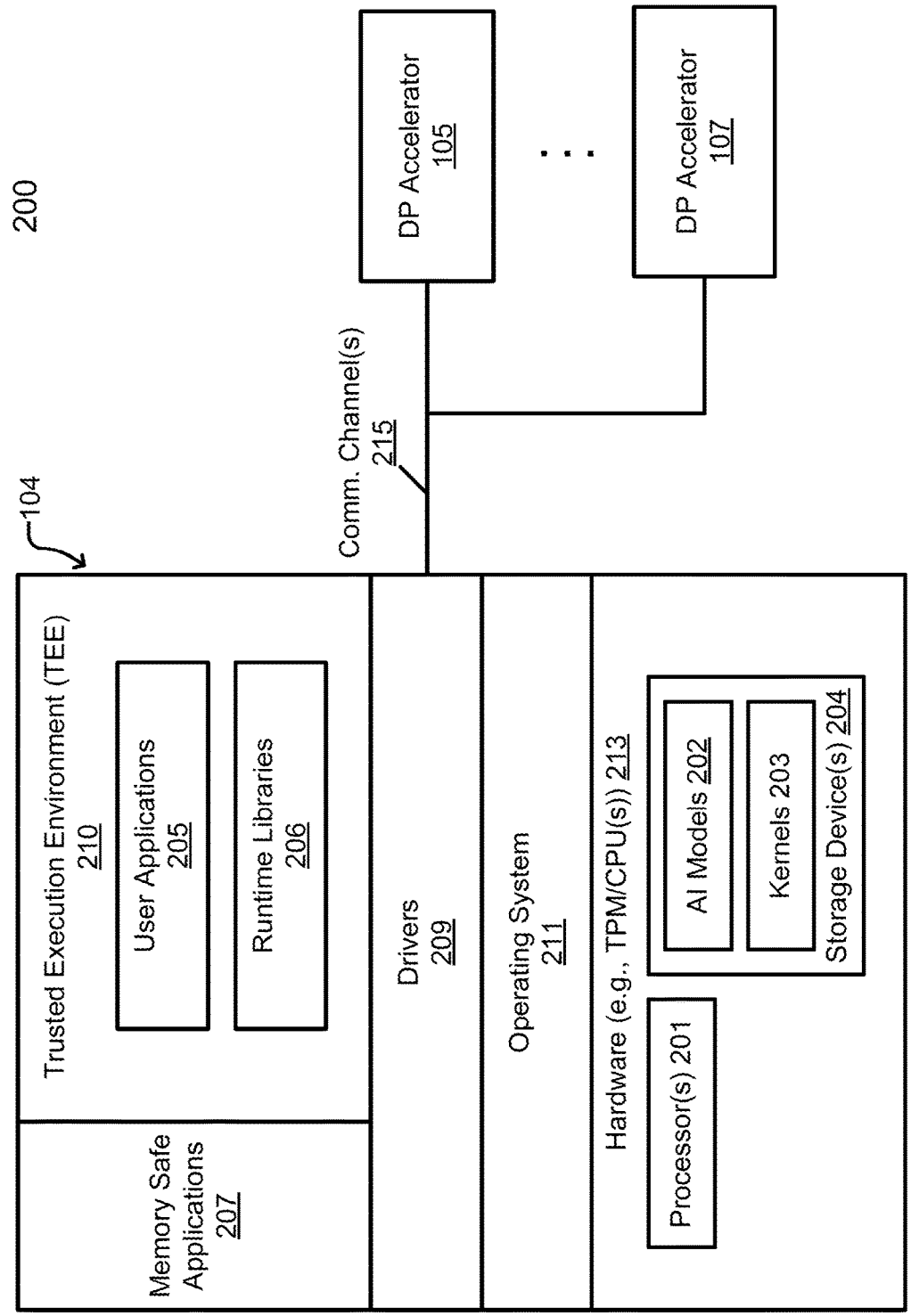
FIGS. 2A and 2B are a block diagrams illustrating a secure computing environment between one or more hosts and one or more data processing accelerators, according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to the DP accelerator. A DP accelerator can be a general-purpose processing unit (GPU), an artificial intelligence (AI) accelerator, math coprocessor, digital signal processor (DSP), or other type of processor. A DP accelerator can be a proprietary design, such as a Baidu® AI accelerator, or another GPU, and the like. While embodiments are illustrated and described with host device securely coupled to one or more DP accelerators, the concepts described herein can be implemented more generally as a distributed processing system.

The host device and the DP accelerator can be interconnected via a high-speed bus, such as a peripheral component interconnect express (PCIe), or other high-speed bus. The host device and DP accelerator can exchange keys and initiate a secure channel over the PCIe bus before performing operations of the aspects of the invention described below. Some of the operations include the DP accelerator using an artificial intelligence (AI) model to perform inferences using data provided by the host device. Before the AI model inferences are trusted by the host device, the host device can engage the DP accelerator to perform one or more validation tests, described below, including determining a watermark of the AI model. In some embodiments and operations, the DP accelerator is not aware that the host device is testing the validity of results produced by the DP accelerator.

A watermark of an AI model is an identifier or indicator embedded within the AI model, or in outputs of the AI model, or a combination thereof, that identifies or indicates the source/maker of the AI model. In some embodiments, the watermark can be a subset of coefficients or parameters such as weights within the AI model that, when extracted from the AI model, comprise the watermark. Some of the goals of the watermark include: identifying the AI model by its watermark; storing information, such as digital rights, within the AI model but without affecting inferences generated by the model, and associating inferences generated by an AI model to the AI model that generated the inferences, using the watermark as an identifier. The watermark should not be easily discoverable outside of a secure computing environment.

In an embodiment, the host device can send an input to the DP accelerator that, when the DP accelerator executes the AI model using the input, extracts the watermark from the AI model. The host device can validate the watermark before using the DP accelerator and/or AI model for trusted operations. A watermark-enabled AI model is an AI model that can extract its own watermark in response to specified input data.

In some embodiments, the host device can transmit a kernel to the DP processing device to use in performing one or more operations. In this context, a kernel is a small piece of code, provided to the DP accelerator, to be executed by the DP accelerator to perform the intended function of the kernel. In an embodiment, a kernel is provided to the DP accelerator by the host device as a part of performing proof-of-trust operations by the DP accelerator that will be validated by the host device. In some embodiments, the DP accelerator is not aware of the purpose of the kernel it executes on behalf of the host device.

In some embodiments, the kernel can be a "watermark-enabled kernel." A watermark-enabled kernel is a kernel that, when executed, is capable of extracting a watermark from an artificial intelligence (AI) model. An AI watermark is associated with a specific AI model and can be embedded or "implanted," within the AI model using several different methods. The watermark may be implanted into one or more weight variables of the one or more nodes of the AI model. In an embodiment, the watermark is stored in one or more bias variables of the one or more nodes of the AI modes, or by creating one or more additional nodes of the AI model during the training to store the watermark.

In some embodiments, the kernel can be a "watermark-inherited kernel." A watermark-inherited kernel is a kernel that can inherit a watermark from a data object, e.g. an existing AI model, or other data object. The kernel can then implant the inherited watermark into another AI model or an inference generated by an AI model.

In some embodiments, the kernel can be a "signature kernel," that can digitally sign any input that it receives. The signature kernel can generate a hash or digest of the input data to be signed and can embed that hash or digest into the input to be signed before signing the input. The hash or digest can be any hash algorithm, such as SHA-1, SHA-2, or SHA-3, et al. The input data with hash or digest can be encrypted (signed) using a private key of the data processing (DP) accelerator, a symmetric key shared with a host device, or a key received from the host device.

In some embodiments, a watermark-enabled AI model is an AI model having a watermark implanted within the AI model. In some embodiments, a host device may provide a watermark-enabled kernel to the DP accelerator so that the DP accelerator can, e.g., use an AI model to make an inference, then use the watermark-enabled kernel to extract the watermark from the AI model, embed the watermark in the inference, and digitally sign the inference. Such an embodiment allows the host device to verify that the DP accelerator did, indeed, use the correct AI model to perform the inference, indicating that the inference may be trusted.

With respect to any of the following aspects, in one embodiment, a watermark may be embedded in one or more nodes of one or more layers of an artificial intelligence (AI) model. For example, a watermark may be implanted in one or more weight variables or bias variables. Alternatively, one or more nodes (e.g., fake nodes that are not used or unlikely used by the artificial intelligence model) may be created to implant or store the watermark. A host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a network (e.g., cloud computing systems such as a software as a service or SaaS system, or a platform as a service or PaaS system). A link between a host processor and a DP accelerator may be a peripheral component interconnect express (PCIe) link or a network connection such as Ethernet connection.

In a first aspect, a computer-implemented method of a data processing (DP) accelerator obtaining a watermark of a watermark-enable artificial intelligence (AI) model includes receiving, by the DP accelerator, input data to the DP accelerator that causes the watermark-enabled AI model to extract the watermark from the watermark-enabled AI model; and providing the watermark of the watermark-enabled AI model to the host device. The DP accelerator can receive the model from the host device. The DP accelerator can further receive a command to digitally sign the watermark and call a security unit of the DP accelerator to digitally sign the watermark.

In a second aspect, a computer-implemented method of a DP accelerator performing an encryption or decryption operation includes receiving, by the DP accelerator, a command and input data for the DP accelerator to encrypt or decrypt. The command is one of: encrypt the input data or decrypt the input data. The method further includes encrypting, or decrypting, by the DP accelerator, the input data according to the command; and providing the encrypted or decrypted input data to the host device. The host device and DP accelerator may exchange one or more keys and such keys can be used to establish a secure link between the host device and DP accelerator and/or to use for encryption or decryption. One or more of the keys may be based upon a root key or key pair of the DP accelerator and can be stored in a secure storage of a security unit of the DP accelerator.

In a third aspect, a computer-implemented method of a data processing (DP) accelerator encrypting or decrypting input data can include receiving, from a host device, a command, the input data, and a kernel. The kernel can be an encryption kernel, or a decryption kernel, and the DP accelerator need not know which kernel it has received. The DP accelerator runs the received kernel. In response to the DP accelerator receiving the command, the DP accelerator performs encrypting of the input data using the kernel, if the received kernel is an encryption kernel, otherwise, decrypting the input data using the kernel. The encrypted, or decrypted, input data is then provided to the host device. The host device and DP accelerator may exchange one or more keys and such keys can be used to establish a secure link between the host device and DP accelerator and/or to use for encryption or decryption. One or more of the keys may be based upon a root key or key pair of the DP accelerator and can be stored in a secure storage of a security unit of the DP accelerator.

In a fourth aspect, a computer-implemented method of a data processing (DP) accelerator obtaining a watermark of an artificial intelligence (AI) model includes receiving, from a host device, the AI model to execute on the DP accelerator, and receiving input data that triggers output from the AI model on the DP accelerator. The DP accelerator calculates AI model output, in response to the received input and provides the output to the host device. The output can be a watermark extracted from the AI model. DP accelerator can call a security unit of the DP accelerator to digitally sign the output. In an embodiment, the security unit digitally signs the output from the AI model using a key that is retrieved from, or is derived from, a key stored in a secure storage on the security unit.

In a fifth aspect, a computer-implemented method of digitally signing input by a data processing (DP) accelerator operation, and embedding the digitally signed input into an output, includes receiving, from a host device, a signature kernel specifying input to the signature kernel and executing the signature kernel to: extract a watermark from the input and obtain a hash for the watermark; generate output from the input; and embed the hash into the output. The DP accelerator provides the output to the host device. In an embodiment, the input includes an artificial intelligence (AI) model that is executed by the DP accelerator. The DP accelerator receives second input from the host, thereby producing an inference output from the AI model. The digitally signed watermark of the AI Model is embedded into the inference output and is provided to the host device.

In a sixth aspect, a computer implemented method of a data processing (DP) accelerator providing a watermark of an artificial intelligence (AI) model to a host device includes receiving, by the DP accelerator, from the host device, the AI model, and a watermark-enabled kernel to the DP accelerator. The DP accelerator further receives from the host device, first input data to the DP accelerator that, when the first input data is used as input to the watermark-enabled kernel, generates a watermark of the AI model. The watermark is provided to the host device. In an embodiment, the method further includes receiving a signature kernel from the host device and calling the signature kernel to digitally sign the watermark. In an embodiment, the method alternatively includes calling a digital signature routine in a secure unit of the DP accelerator to digitally sign the watermark.

Any of the above functionality can be programmed as executable instructions onto one or more non-transitory computer-readable media. When the executable instructions are executed by a processing system having at least one hardware processor, the processing systems causes the functionality to be implemented. Any of the above functionality can be implemented by a processing system having at least one hardware processor, coupled to a memory programmed with executable instructions that, when executed, cause the processing system to implement the functionality.

FIG. 1 is a block diagram illustrating an example of system configuration for securing communication between a host 104 and data processing (DP) accelerators 105-107 according to some embodiments. Referring to FIG. 1, system configuration 100 includes, but is not limited to, one or more client devices 101-102 communicatively coupled to DP server 104 (e.g. host) over network 103. Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., AI training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu® artificial intelligence (AI) chipset available from Baidu, Inc.® or alternatively, the DP accelerator may be an AI chipset from another AI chipset provider.

According to one embodiment, each of the applications accessing any of DP accelerators 105-107 hosted by data processing server 104 (also referred to as a host) may verify that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, an obscured connection can be established between host 104 and the corresponding one of the DP accelerator 105-107, such that the data exchanged between host 104 and DP accelerators 105-107 is protected against attacks from malware/intrusions.

FIG. 2A is a block diagram illustrating an example of a multi-layer protection solution for obscured communications between a host system 104 and data process (DP) accelerators 105-107 according to some embodiments. In one embodiment, system 200 provides a protection scheme for obscured communications between host 104 and DP accelerators 105-107 with or without hardware modifications to the DP accelerators. Referring to FIG. 2A, host machine or server 104 can be depicted as a system with one or more layers to be protected from intrusion such as user application(s) 205, runtime libraries 206, driver 209, operating system 211, and hardware 213 (e.g., security module (trusted platform module (TPM))/central processing unit (CPU)). Memory safe applications 207 can run in a sandboxed memory. Below the applications 205 and run-time libraries 206, one or more drivers 209 can be installed to interface to hardware 213 and/or to DP accelerators 105-107.

Hardware 213 can include one or more processor(s) 201 and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object. A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 is typically a CPU system which can control and manage execution of jobs on the host machine 104 and/or DP accelerators 105-107. In order to secure/obscure a communication channel 215 between DP accelerators 105-107 and host machine 104, different components may be required to protect different layers of the host system that are prone to data intrusions or attacks. For example, a trusted execution environment (TEE) can protect the user application 205 layer and the runtime library 206 layer from data intrusions.

System 200 includes host system 104 and DP accelerators 105-107 according to some embodiments. DP accelerators can include Baidu® AI chipsets or another AI chipset such as a graphical processing units (GPUs) that can perform artificial intelligence (AI)-intensive computing tasks. In one embodiment, host system 104 includes a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot.

The TPM chip also secure driver(s) 209 and operating system (OS) 211 in a working kernel space to communicate with the DP accelerators 105-107. Here, driver 209 is provided by a DP accelerator vendor and can serve as a driver for the user application to control a communication channel(s) 215 between host and DP accelerators. Because the TPM chip and secure boot processor protects the OS 211 and drivers 209 in their kernel space, TPM also effectively protects the driver 209 and OS 211.

Since communication channels 215 for DP accelerators 105-107 may be exclusively occupied by the OS 211 and driver 209, thus, communication channels 215 can be secured through the TPM chip. In one embodiment, communication channels 215 include a peripheral component interconnect or peripheral component interconnect express (PCIE) channel. In one embodiment, communication channels 215 are obscured communication channels.

Host machine 104 can include trusted execution environment (TEE) 210 which is enforced to be secure by TPM/CPU 213. A IEE is a secure environment. TEE can guarantee code and data which are loaded inside the TEE to be protected with respect to confidentiality and integrity. Examples of a TEE may be Intel® software guard extensions (SGX), or AMD® secure encrypted virtualization (SEV). Intel® SGX and/or AMD® SEV can include a set of central processing unit (CPU) instruction codes that allows user-level code to allocate private regions of memory of a CPU that are protected from processes running at higher privilege levels. Here, TEE 210 can protect user applications 205 and runtime libraries 206, where user application 205 and runtime libraries 206 may be provided by end users and DP accelerator vendors, respectively. Here, runtime libraries 206 can convert application programming interface (API) calls to commands for execution, configuration, and/or control of the DP accelerators. In one embodiment, runtime libraries 206 provides a predetermined set of (e.g., predefined) kernels for execution by the user applications. In an embodiment, the kernels may be stored in storage device(s) 204 as kernels 203.

Host machine 104 can include memory safe applications 207 which are implemented using memory safe languages such as Rust, and GoLang, etc. These memory safe applications running on memory safe Linux® releases, such as MesaLock Linux®, can further protect system 200 from data confidentiality and integrity attacks. However, the operating systems may be any Linux® distributions, UNIX®, Windows® OS, or Mac® OS.

The host machine 104 can be set up as follows: A memory safe Linux® distribution is installed onto a system equipped with TPM secure boot. The installation can be performed offline during a manufacturing or preparation stage. The installation can also ensure that applications of a user space of the host system are programmed using memory safe programming languages. Ensuring other applications running on host system 104 to be memory safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating 211 system can be loaded through a hypervisor (not shown). A hypervisor or a virtual machine manager is a computer software, firmware, or hardware that creates and runs virtual machines. A kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 206 runs and creates TEE 210, which places runtime libraries 206 in a trusted memory space associated with CPU 213. Next, user application 205 is launched in TEE 210. In one embodiment, user application 205 and runtime libraries 206 are statically linked and launched together. In another embodiment, runtime library 206 is launched in TEE 210 first and then user application 205 is dynamically loaded in TEE 210. In another embodiment, user application 205 is launched in TEE first, and then runtime 206 is dynamically loaded in TEE 210. Statically linked libraries are libraries linked to an application at compile time. Dynamic loading can be performed by a dynamic linker. Dynamic linker loads and links shared libraries for running user applications at runtime. Here, user applications 205 and runtime libraries 206 within TEE 210 are visible to each other at runtime, e.g., all process data are visible to each other. However, external access to the TEE is denied.

In one embodiment, the user application 205 can only call a kernel from a set of kernels as predetermined by runtime libraries 206. In another embodiment, user application 205 and runtime libraries 206 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In one embodiment, TEE 210 and/or memory safe applications 207 is not necessary, e.g., user application 205 and/or runtime libraries 206 is hosted in an operating system environment of host 104.

In one embodiment, the set of kernels include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm.

Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations.

Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model.

In summary, system 200 provides multiple layers of protection for DP accelerators (for data transmissions including machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory safe programming languages, which can further eliminate attacks by eliminating potential memory corruptions/vulnerabilities. Moreover, system 200 can include applications that use side-channel free algorithms so to defend against side channel attacks, such as cache based side channel attacks.

Runtime 206 can provide obfuscation kernel algorithms to obfuscate data communication between a host 104 and DP accelerators 105-107. In one embodiment, the obfuscation can be pair with a cryptography scheme. In another embodiment, the obfuscation is the sole protection scheme and cryptography-based hardware is rendered unnecessary for the DP accelerators.

Figure 2B:
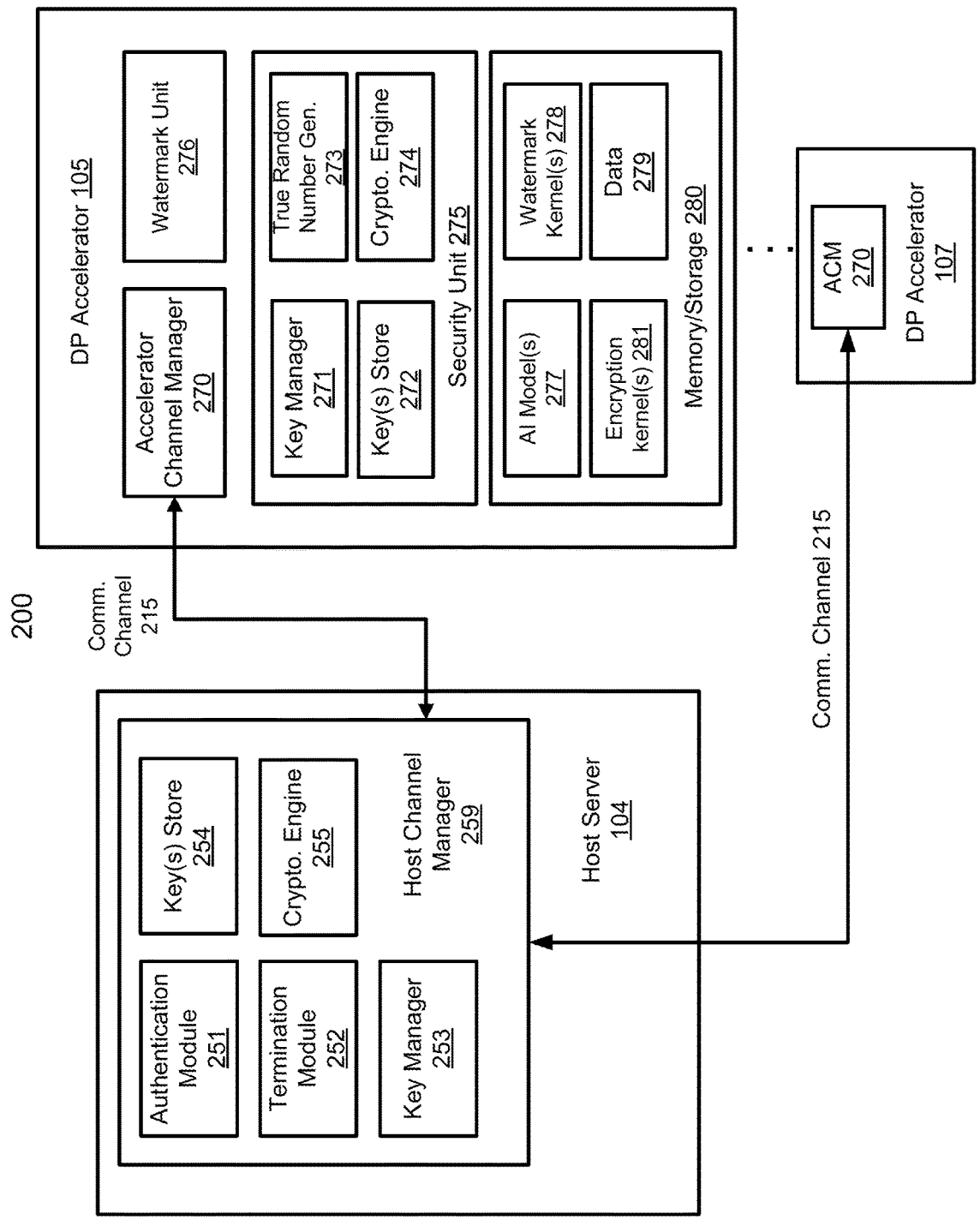

FIG. 2B is a block diagram illustrating an example of a host channel manager (HCM) 259 communicatively coupled to one or more accelerator channel managers (ACMs) 270 that interface to DP accelerators 105-107, according to some embodiments. Referring to FIG. 2B, in one embodiment, HCM 259 includes authentication module 251, termination module 252, key manager 253, key(s) store 254, and cryptography engine 255. Authentication module 251 can authenticate a user application running on host server 104 for permission to access or use a resource of a DP accelerator 105.

Termination module 252 can terminate a connection (e.g., channels associated with the connection would be terminated). Key manager 253 can manage (e.g., create or destroy) asymmetric key pairs or symmetric keys for encryption/decryption of one or more data packets for different secure data exchange channels. Here, each user application (as part of user applications 205 of FIG. 2A) can correspond or map to different secure data exchange channels, on a one-to-many relationship, and each data exchange channel can correspond to a DP accelerator 105. Each application can utilize a plurality of session keys, where each session key is for a secure channel corresponding to a DP accelerator (e.g., accelerators 105. 107). Key(s) store 254 can store encryption asymmetric key pairs or symmetric keys. Cryptography engine 255 can encrypt or decrypt a data packet for the data exchanged through any of the secure channels. Note that some of these modules can be integrated into fewer modules.

In one embodiment, DP accelerator 105 includes ACM 270 and security unit (SU) 275. Security unit 275 can include key manager 271, key(s) store 272, true random number generator 273, and cryptography engine 274. Key manager 271 can manage (e.g., generate, safe keep, and/or destroy) asymmetric key pairs or symmetric keys. Key(s) store 272 can store the cryptography asymmetric key pairs or symmetric keys in secure storage within the security unit 275. True random number generator 273 can generate seeds for key generation and cryptographic engine 274 uses. Cryptography engine 274 can encrypt or decrypt key information or data packets for data exchanges. In some embodiments, ACM 270 and SU 275 is an integrated module.

DP accelerator 105 can further includes memory/storage 280 that can store artificial intelligence model(s) 277, watermark kernel(s) 278 (including inherited watermark kernels watermark-enabled kernels, watermark-signature kernels, et al.), encryption and decryption kernels 281, and data 279. HCM 259 can communicate with ACM 270 via communication channel 215.

In one embodiment, DP accelerator 105 further includes an AI unit, which may include an AI training unit and an AI inference unit. The AI training and inference units may be integrated into a single unit. The AI training module is configured to train an AI model using a set of training data. The AI model to be trained and the training data may be received from host system 104 via communication link 215. The AI model inference unit can be configured to execute a trained artificial intelligence model on a set of input data (e.g., set of input features) to infer and classify the input data. For example, an image may be input to an artificial intelligence model to classify whether the image contains a person, a landscape, etc. The trained artificial intelligence model and the input data may also be received from host system 104 via interface 140 over communication link 215.

In one embodiment, watermark unit 276 may include a watermark generator, and a watermark inscriber (also termed, "watermark implanter"). Watermark unit 276 may include a watermark kernel executor or kernel processor (not shown) to execute a kernel. In an embodiment, a kernel may be received from host 104, or retrieved from persistent or non-persistent storage, and executed in memory (not shown) of DP accelerator 105. The watermark generator is configured to generate a watermark using a predetermined watermark algorithm. Alternatively, the watermark generator can inherit a watermark from an existing watermark or extract a watermark from another data structure or data object, such as an artificial intelligence model or a set of input data, which may be received from host system 104. The watermark implanter is configured to inscribe or implant a watermark into a data structure such as an artificial intelligence model or output data generated by an artificial intelligence model. The artificial intelligence model or output data having a watermark implanted therein may be returned from DP accelerator 105 to host system 104 over communication link 215. Note that DP accelerators 105-107 have the identical or similar structures or components and the description concerning a DP accelerator would be applicable to all DP accelerators throughout this application.

Figure 3A:
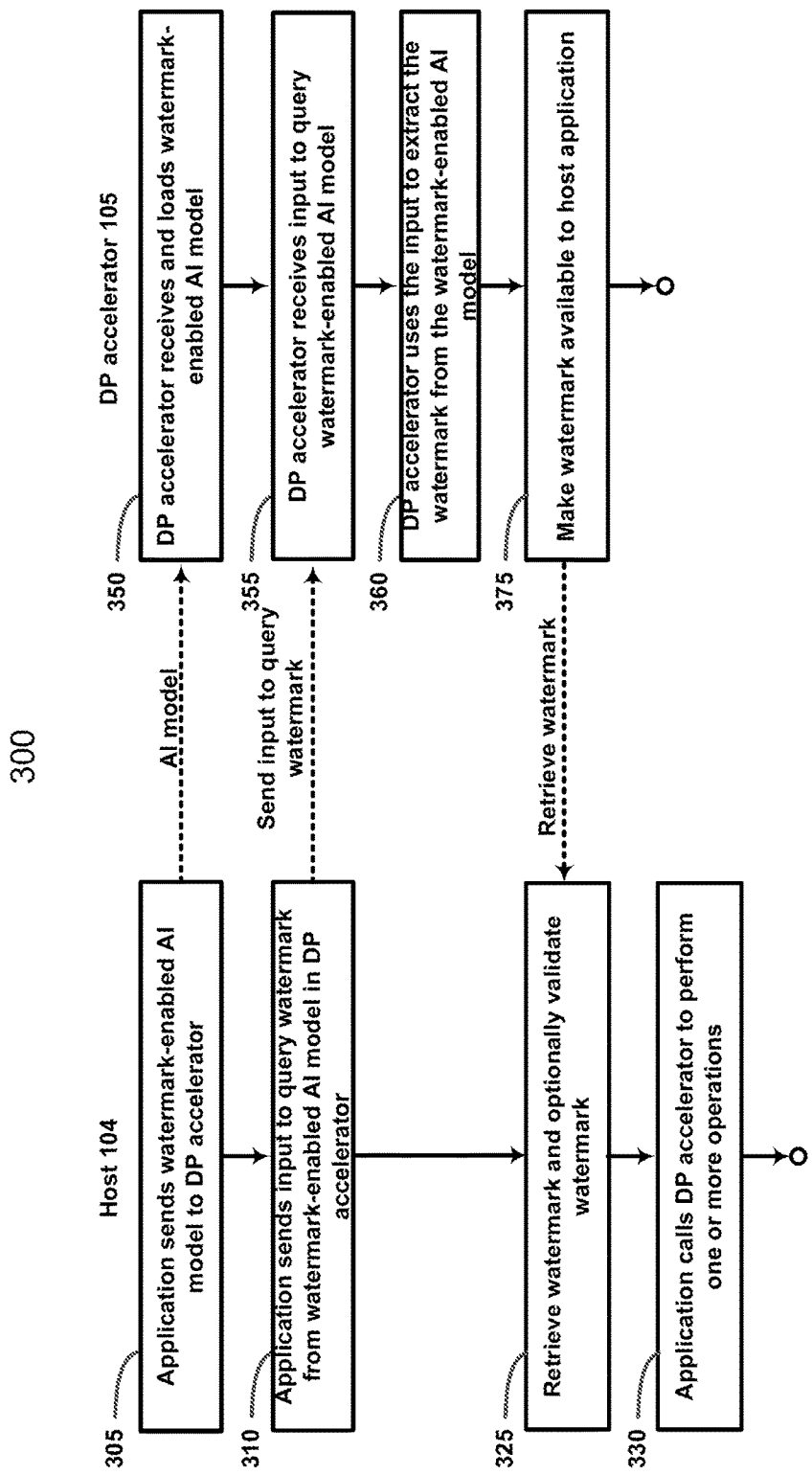
FIGS. 3A and 3B are block diagrams illustrating a method of ensuring that a data processing (DP) accelerator signed a watermark of an artificial intelligence (AI) model, according to an embodiment.
Figure 3B:
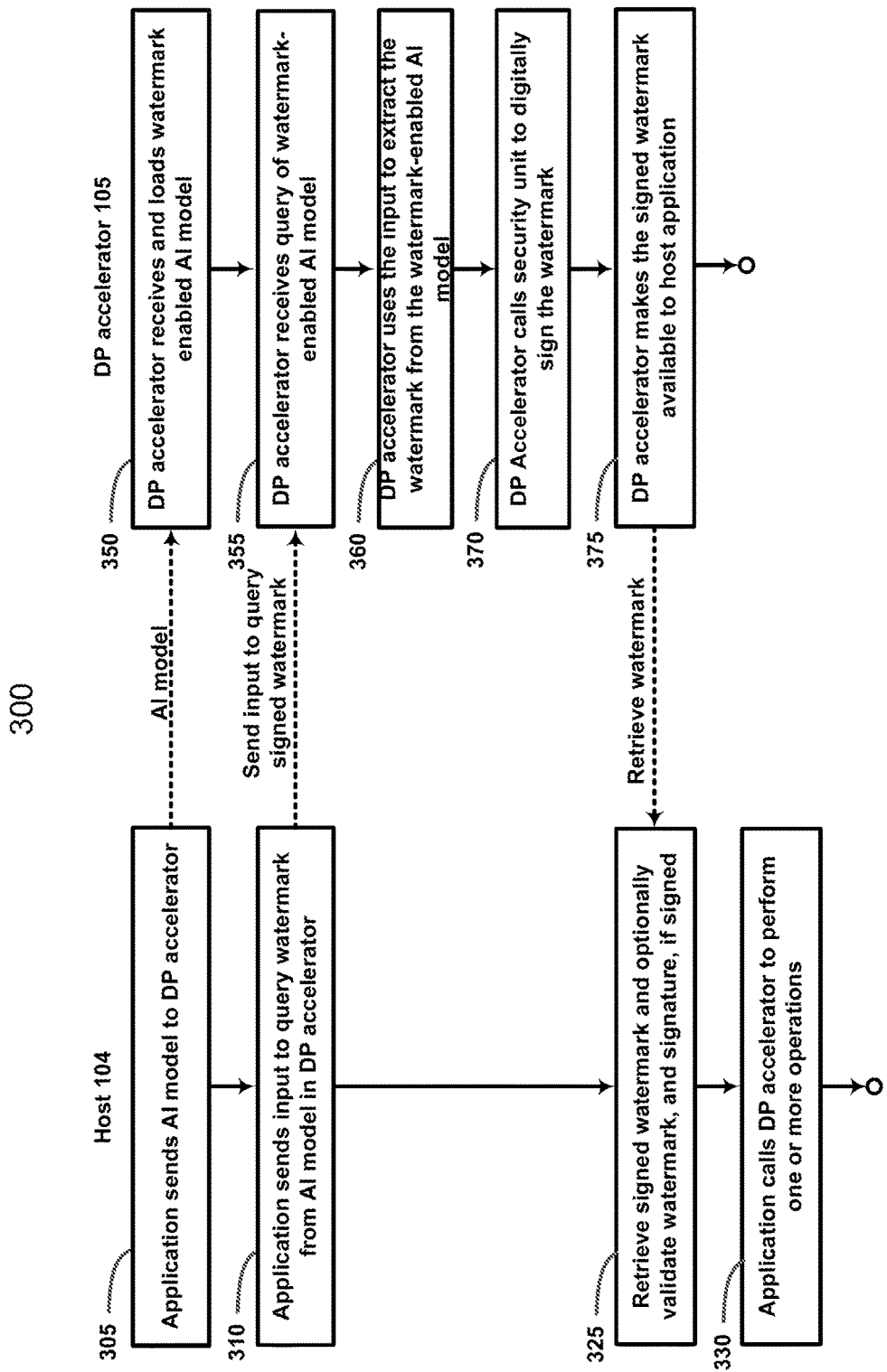

FIGS. 3A and 3B are block diagrams illustrating a method 300 of signing a watermark of an artificial intelligence (AI) model, using a query, according to an embodiment. A purpose of method 300 is to provide a generic watermark signature method to prove that the AI model is indeed used by the DP accelerator 105. In preparation for method 300, host device 104 and DP accelerator 105 may exchange one or more designated keys and establish a secure communication link 215. One or more of the exchanged keys may also be used to digitally sign the watermark extracted from the AI model. In an embodiment, communications between host device 104 and DP accelerator 105 use encryption and decryption to maintain secure communications over communication link 215. Embodiments according to method 300 can use a data processing (DP) accelerator 105 such as Baidu® AI accelerator or other DP accelerator, or an accelerator such as a graphics processing unit (GPU).

Referring now to FIG. 3A, a method 300 of producing a valid watermark from an AI model is described according to one embodiment. In operation 305, an application on host device 104 sends a watermark-enabled AI model to DP accelerator 105. In operation 350 DP accelerator 105 receives the watermark-enabled AI model and loads the watermark-enabled AI model for execution.

In operation 310, the application on host device 104 sends input data, which can be in the form of a query, to DP accelerator 105. In operation 355, DP accelerator receives the input data from host device 104 and, in operation 360, DP accelerator runs the AI model using input data to extract the watermark from the watermark-enabled AI model.

In operation 325, host device 104 can retrieve the watermark from the DP accelerator 105, that DP accelerator 105 has made available to the host device 104, in operation 375. The host device 104 can optionally validate the received watermark before making further calls to the DP accelerator 105 to perform operations in accordance with method 300. In operation 325, host device 104 can perform one or more validation operations on the watermark to ensure that the watermark extracted from the watermark-enabled AI model is valid. The host device 104 may compare the watermark obtained from the DP accelerator 105 with a pre-existing watermark to determine whether the watermark received from the DP accelerator 105 is valid.

Alternatively, in an embodiment, host device 104 can validate the watermark by running the watermark-enabled AI model with the input data to obtain the watermark and comparing the obtained watermark with the watermark received from the DP accelerator 105. If the two watermarks match, then the DP accelerator 105 used the watermark-enabled AI model to produce the watermark, and the watermark is determined to be valid. If the watermark is valid, then the application on host device 104 can make one or more additional calls to DP accelerator 105 using the watermark-enabled AI model, such as to perform one or more inferences using the watermark-enabled AI model. In operation 330, host 104 can make one or more calls to DP accelerator to perform operations of method 300.

Referring now to FIG. 3B, FIG. 3B describes a method 300 of extracting a watermark from an artificial intelligence (AI) model and digitally signing the watermark.

In operation 305, an application on host device 104 sends a watermark-enabled AI model to DP accelerator 105. In operation 350, DP accelerator 105 receives the watermark-enabled AI model and loads the watermark-enabled AI model for execution.

In operation 310, host device 104 sends input data, which can be in the form of a query, to DP accelerator 105. In operation 355, DP accelerator receives the input data from host device 104 and, in operation 360, DP accelerator runs the watermark-enabled AI model using the input data to extract the watermark of the watermark-enabled AI model.

In operation 370, DP accelerator 105 calls security unit 275 to digitally sign the watermark. In an embodiment, the watermark can be digitally signed with a private key of the DP accelerator, or with a symmetric key. The private key of the DP accelerator, or the symmetric key, can be one of the one or more keys exchanged with the host device 104 and DP accelerator 105, as described above. In an embodiment, digitally signing the watermark by the security unit 275 of DP accelerator 105 includes computing a hash or digest of the watermark and including the hash or digest with the digitally signed watermark.

In operation 325, host device 104 can retrieve the digitally signed watermark from the DP accelerator 105, that DP accelerator 105 has made available to the host device 104, in operation 375. The host device 104 can optionally validate the received watermark before making further calls to the DP accelerator 105 to perform operations in accordance with method 300. Host device 104 can perform one or more validation operations on the digitally signed watermark. The host device 104 may compare the watermark obtained from the DP accelerator 105 with a pre-existing watermark to determine whether the watermark received from the DP accelerator 105 is valid.

Alternatively, in an embodiment, host 104 can decrypt the digital signature on the watermark using a public key of the DP accelerator 105, or a symmetric key. After decrypting the digital signature, host device 104 can verify the unsigned watermark by running the watermark-enabled AI model with the input data to extract the watermark and comparing the extracted watermark with the watermark received from the DP accelerator 105. If the two watermarks match, then the DP accelerator 105 used the watermark-enabled AI model to produce the watermark and the digital signature was determined to be valid. In operation 330, the application on host device 104 can make one or more additional calls to DP accelerator 105 that utilize the watermark-enabled AI model.

Figure 4A:
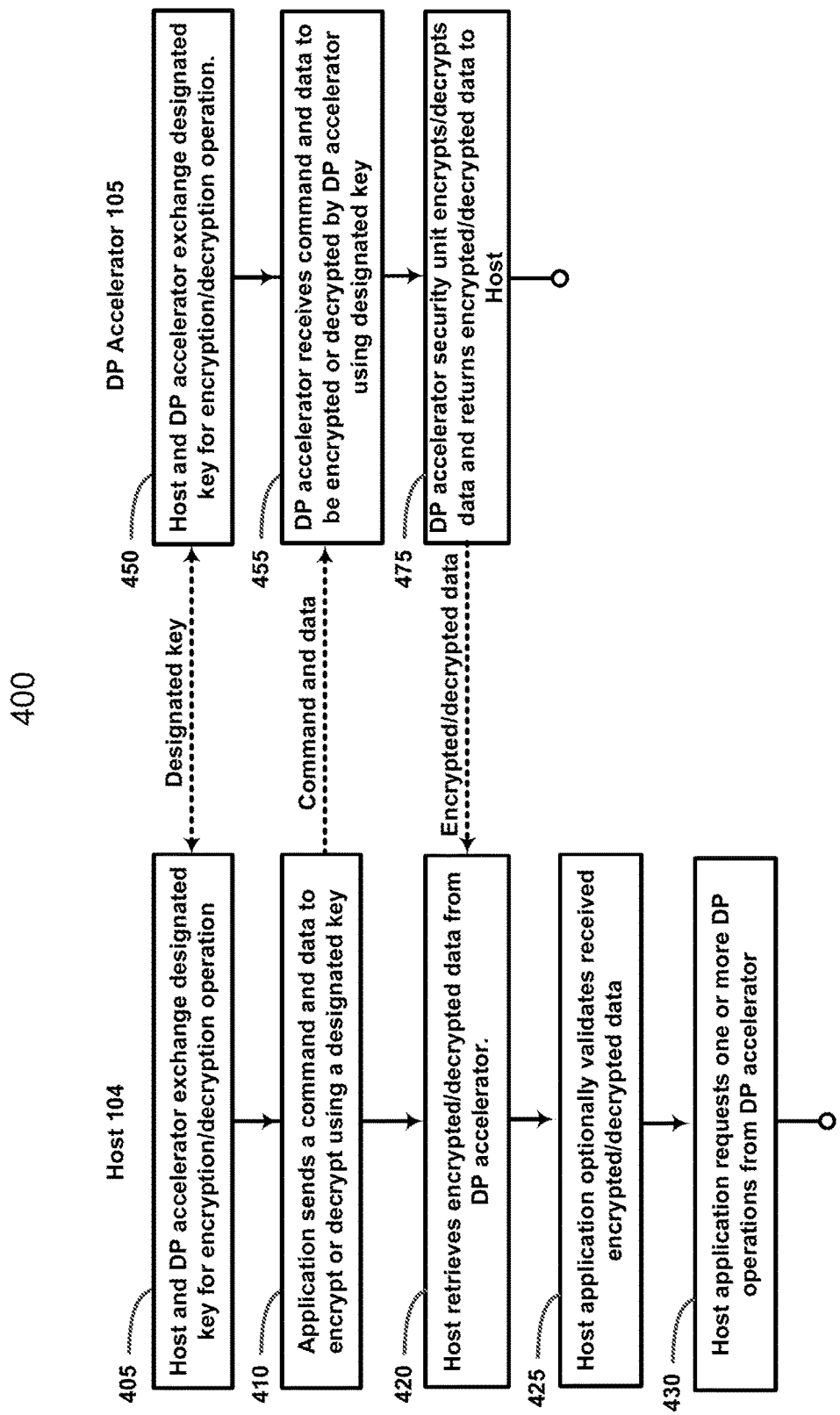
FIGS. 4A and 4B are block diagrams illustrating a method of securely encrypting or decrypting data using a DP accelerator having a cryptographic module, according to an embodiment.
Figure 4B:
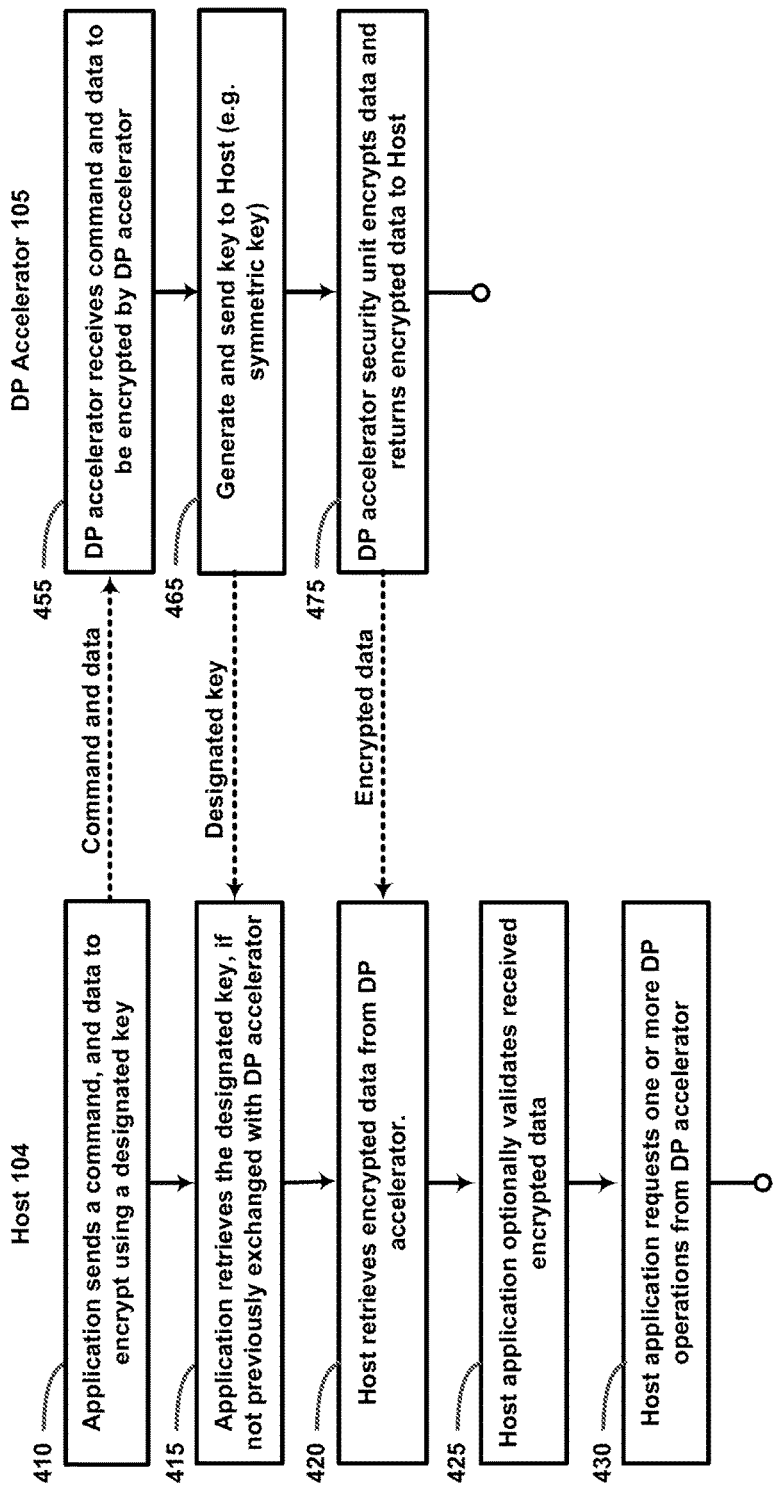

FIGS. 4A and 4B are block diagrams illustrating a method 400 of securely encrypting or decrypting data using a data processing (DP) accelerator, according to some embodiments. In preparation for method 400, host device 104 and DP accelerator 105 can exchange one or more designated keys and establish a secure communication channel 215 for communicating. Embodiments according to method 400 can use, as a DP accelerator 105, an accelerator such as Baidu® artificial intelligence (AI) accelerator or other AI accelerator, or a graphics processing unit (GPU).

Referring now to FIG. 4A, in operations 405 and 450, host device 104 and DP accelerator 105 can exchange one or more designated keys. The designated keys can include one or more symmetric keys and/or one or more asymmetric key pairs. A symmetric key can be used for secure communication sessions between the host device 104 and DP accelerator 105 over communications channel 215. Asymmetric keys can be used for encrypting and decrypting data and digital signatures. In an embodiment, sharing designated keys comprises the host device 104 sharing a public key of the host device 104 with the DP accelerator 105 and the DP accelerator 105 sharing a public key of the DP accelerator with the host device 104.

In operation 410, an application on the host device 104 sends a command and data to the DP accelerator 105, to encrypt or decrypt using one of the designated keys. In operation 455, DP accelerator 105 receives the command (encrypt or decrypt) and data to be encrypted or decrypted by the DP accelerator 105, using the designated key.

In operation 475, a cryptographic engine 274 of DP accelerator security unit 275 encrypts, or decrypts, the data received from host device 104 in accordance with the command received from host device 104. DP accelerator 105 makes the encrypted, or decrypted, data available to host device 104. In operation 420, host device 104 can retrieve the encrypted, or decrypted, data from DP accelerator 105.

In operation 425, an application on host device 104 can optionally validate the received encrypted or decrypted data. If the command was "encrypt," then the host device 104 can decrypt the received encrypted data using a public key of the DP accelerator 105. The host device can then compare the decrypted data to the clear-text input data sent to the DP accelerator to encrypt. If the comparison is a match, then the encryption operation is validated. If the command was "decrypt" then the host device 104 can compare the clear-text of the input data encrypted data sent to the DP accelerator 105 against the decrypted data received from the DP accelerator.

Alternatively, in an embodiment, host device 104 can decrypt the clear-text data that the host device 104 previously sent to the DP accelerator 105 to decrypt. Host device 104 can compare the result of the clear-text input of the encrypted data sent to the DP accelerator, or the host decrypting the encrypted data, with the decrypted data returned to the host device 104 by DP accelerator 105. If the comparison is a match, then the decryption operation is validated.

In operation 430, Host device 104 can request one or more additional encryption or decryption operations from the DP accelerators 150. In an embodiment, if the encryption or decryption operation was not validated, then host device 104 can opt to not make additional encryption or decryption calls to DP accelerator 105. Method 400 ends.

Referring now to FIG. 4B, in operation 410, an application on the host device 104 sends a command and data to the DP accelerator 105 to encrypt the data. In operation 455, DP accelerator 105 receives the encryption command and data to be encrypted by the DP accelerator 105.

In operation 465, the DP accelerator 105 generates a new symmetric key or asymmetric key pair using the security unit 275. DP accelerator 105 transmits a key (e.g. a public key of a newly generated asymmetric key pair) to the host device 104. In operation 415, host device 104 receives the key from DP accelerator 105.

In operation 475, a cryptographic engine 274 of DP accelerator security unit 275 encrypts the data received from host device 104 in accordance with the command received from host device 104. DP accelerator 105 can encrypt the data with, e.g., a private key of an asymmetric key pair generated in operation 465, above. DP accelerator 105 makes the encrypted data available to host device 104. In operation 420, host device 104 can retrieve the encrypted data from DP accelerator 105.

In operation 425, an application on host device 104 can optionally validate the received encrypted data. The host device 104 can decrypt the received encrypted data using a public key of the DP accelerator 105. The host device 104 can then compare the decrypted data to the clear-text input data sent to the DP accelerator to encrypt. If the comparison is a match, then the encryption operation was validated.

In operation 430, host device 104 can request one or more encryption operations from the DP accelerator 105. In an embodiment, if the encryption operation was not validated, then host device 104 can opt to not make additional encryption calls to DP accelerator 105. Method 400 ends.

Figure 5A:
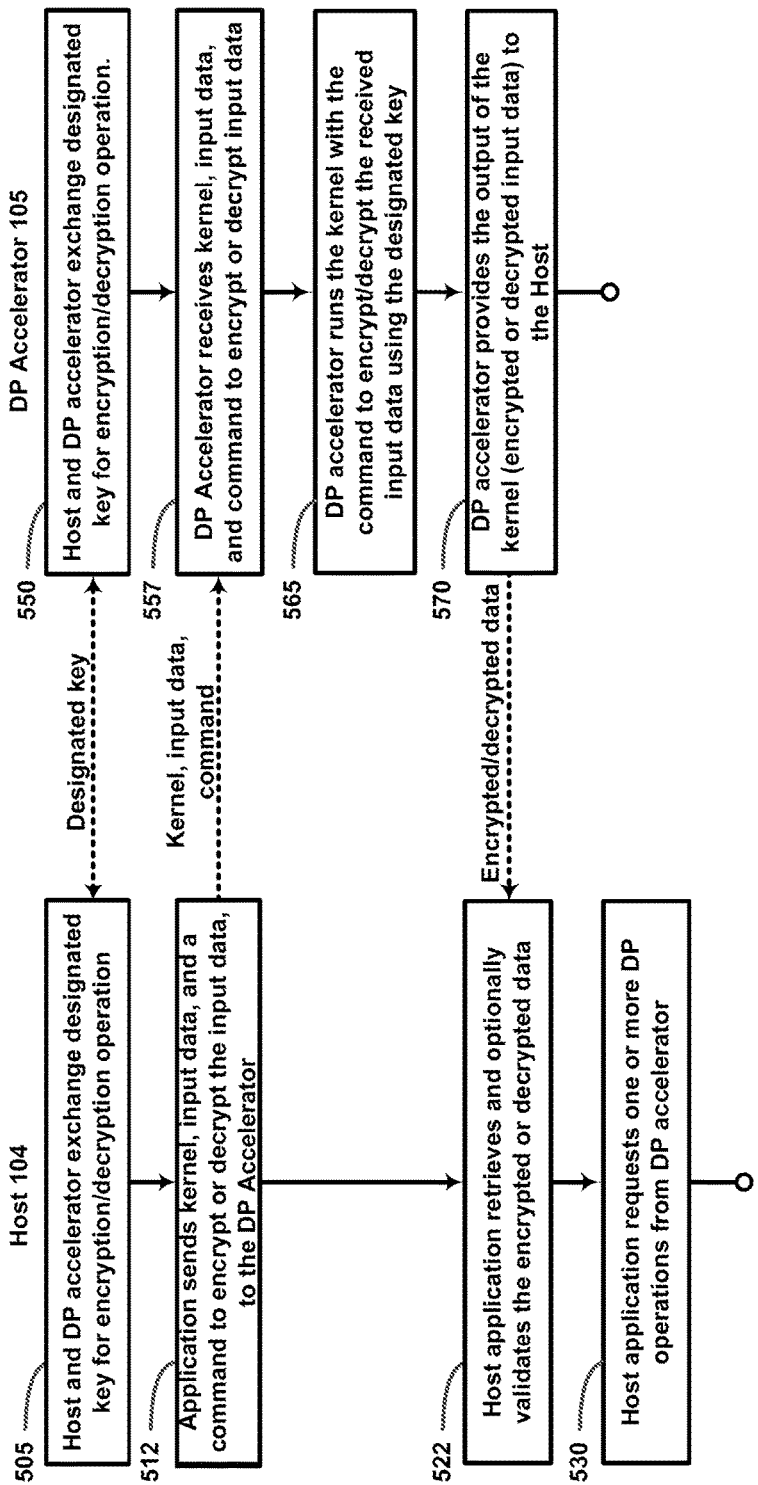
FIGS. 5A and 5B are block diagrams illustrating a method of securely encrypting or decrypting data using a host-provided kernel and a DP accelerator, according to an embodiment.
Figure 5B:
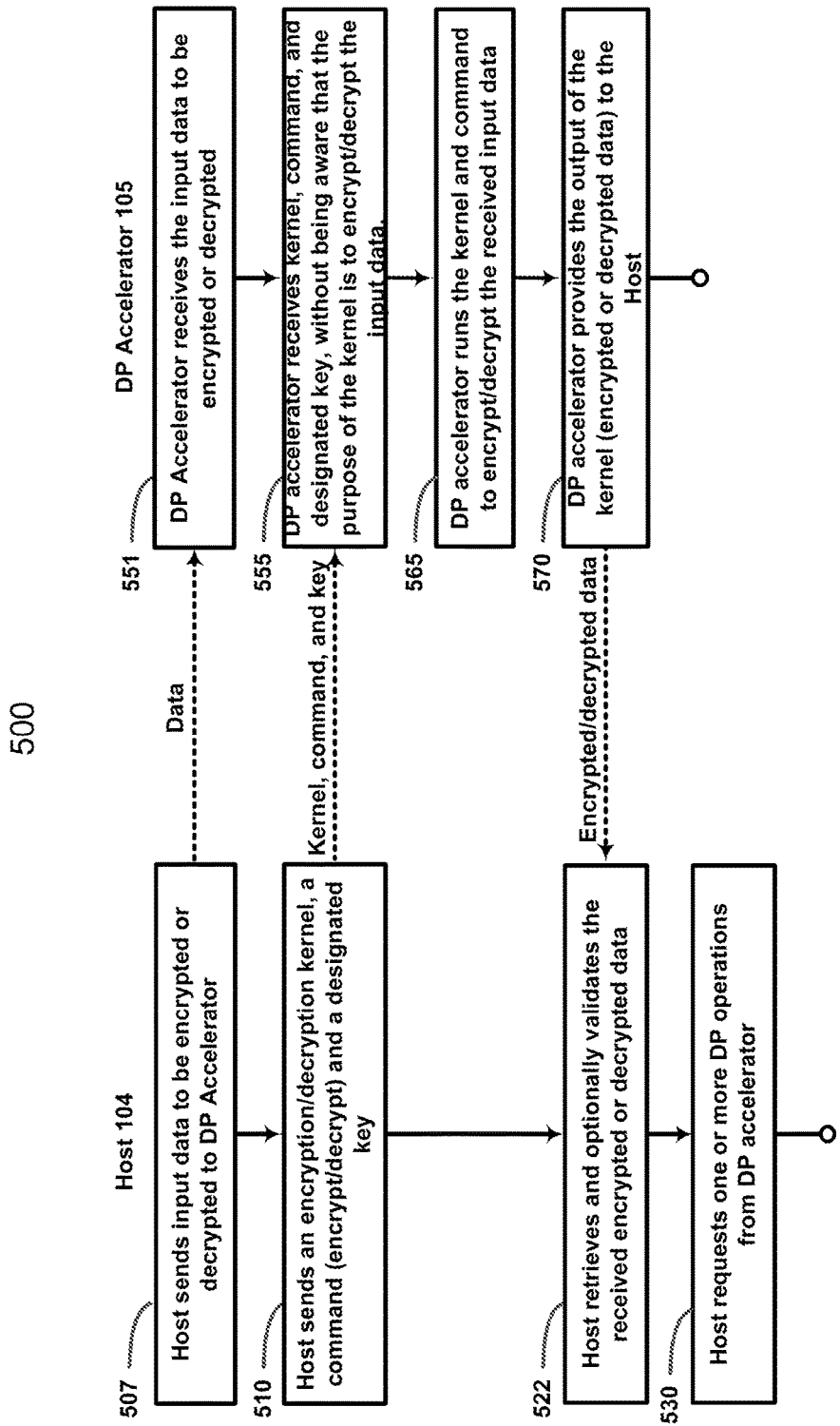

FIGS. 5A and 5B are block diagrams illustrating a method 500 of encrypting or decrypting data using a host-provided encryption kernel, or decryption kernel, and a DP accelerator 105, according to an embodiment. The DP accelerator can be a Baidu® artificial intelligence (AI) processor, a graphics processing unit (GPU), a multi-core processor, a DSP processor, or other DP accelerator.

Referring now to FIG. 5A, in operations 505 and 550, host device 104 and DP accelerator 105 can exchange one or more designated keys. The designated keys can include one or more symmetric keys and/or one or more asymmetric keys. A symmetric key can be used for communication sessions between the host device 104 and DP accelerator 105 over communications channel 215. Asymmetric keys can be used for encrypting and decrypting data and digital signatures. In an embodiment, sharing designated keys comprises the host device 104 sharing a public key of the host device 104 with the DP accelerator 105 and the DP accelerator 105 sharing a public key of the DP accelerator with the host device 104.

In operation 512, an application on host device 104 can transmit to the DP accelerator an encryption kernel or a decryption kernel, a command to execute the kernel, and input data to be encrypted or decrypted. In operation 557, the DP accelerator 105 receives the encryption kernel or decryption kernel, input data, and command to execute the kernel using the input data, from the host device 104.

In operation 565, the DP accelerator 105 runs the received kernel, in response to the command, and using the command to either encrypt or decrypt (depending upon which kernel was received by the DP accelerator 105) the input data using the designated key.

In operation 570, DP accelerator 105 can provide the resultant output of running the encryption kernel or the decryption kernel with the command and input data, to the host device 104. In operation 522, the host device 104 can retrieve the resultant data from the DP accelerator 105 and, optionally, validate the retrieved resultant data. If the kernel transmitted to the DP accelerator was an encryption kernel, then host device 104 can decrypt the resultant data received from DP accelerator 105 using the designated key, or a key corresponding to the designated key in a key pair. Host device 104 can compare the decrypted resultant data to the clear-text of the input data sent to DP accelerator 105 for encryption.

If the decrypted resultant data received from the DP accelerator matches the clear-text input data transmitted by the host device 104 to the DP accelerator 105 in operation 512, then the encryption operation by the DP accelerator is valid. If the kernel received by the DP accelerator was a decryption kernel, then host device 104 can decrypt the input data that host device 104 transmitted to DP processor 150 in operation 512. Host device 104 can compare the decrypted input data with the resultant data received from DP accelerator 105. If the resultant data received from DP accelerator 105 matches the input data decrypted by the host device 104 then the decryption operation is valid.

In operation 530, host device 104 can make one or more additional calls for encryption/decryption operations using the encryption or decryption kernel on the DP accelerator 105. In an embodiment, if the encryption or decryption operation was not validated, host 104 can opt to not make future calls for encryption or decryption operations to DP accelerator 105 using method 500.

Referring now to FIG. 5B, in operation 507, an application on host device 104 transmits input data to be encrypted or decrypted to DP accelerator 105. In operation 551, DP accelerator 105 receives the input data from host device 104. In operation 510, an application on host device 104 can transmit to the DP accelerator 105 an encryption kernel or a decryption kernel, a command to execute the kernel, and a key to be used for encryption or decryption by the DP accelerator 105. In operation 555, the DP accelerator 105 receives the encryption kernel or decryption kernel, the command to execute the kernel, and the key to use for encrypting or decrypting the input data, from the host device 104.

In operation 565, the DP accelerator 105 runs the received encryption kernel or decryption kernel, in response to the command, and using the command to either encrypt or decrypt the input data using the key received from the host 104 (depending upon which kernel was received by the DP accelerator 105).

In operation 570, DP accelerator 105 can provide the resultant output of running the encryption kernel or the decryption kernel with the command, the received key, and the input data, to the host device 104. In operation 522, the host device 104 can retrieve the resultant data from the DP accelerator 105 and, optionally, validate the retrieved resultant data. If the kernel transmitted to the DP accelerator 105 was an encryption kernel, then host device 104 can decrypt the resultant data received from DP accelerator 105 using a key corresponding to the key transmitted to the DP accelerator in operation 510, above.

In an embodiment, the key used by the host 104 to decrypt the resultant data received from the DP accelerator 105 is a private key corresponding to a public key transmitted to the DP accelerator 105. Host device 104 can compare the decrypted resultant data to the clear-text of the input data sent to DP accelerator 105 for encryption. If the decrypted resultant data received from the DP accelerator matches the clear-text input data transmitted by the host device 104 to the DP accelerator 105 in operation 512, then the encryption operation by the DP accelerator is valid.

If the kernel received by the DP accelerator was a decryption kernel, then host device 104 can decrypt the input data that host device 104 transmitted to DP processor 150 in operation 512. Host device 104 can compare the decrypted input data with the resultant data received from DP accelerator 105. If the resultant data received from DP accelerator 105 matches the input data decrypted by the host device 104 then the decryption operation is valid.

In operation 530, host device 104 can call DP accelerator 105 for one or more additional encryption/decryption operations using the encryption kernel or decryption kernel on the DP accelerator 105. In an embodiment, if the encryption or decryption operation was not validated, host 104 can opt to not make future calls for encryption or decryption operations to DP accelerator 105 using method 500.

Figure 6A:
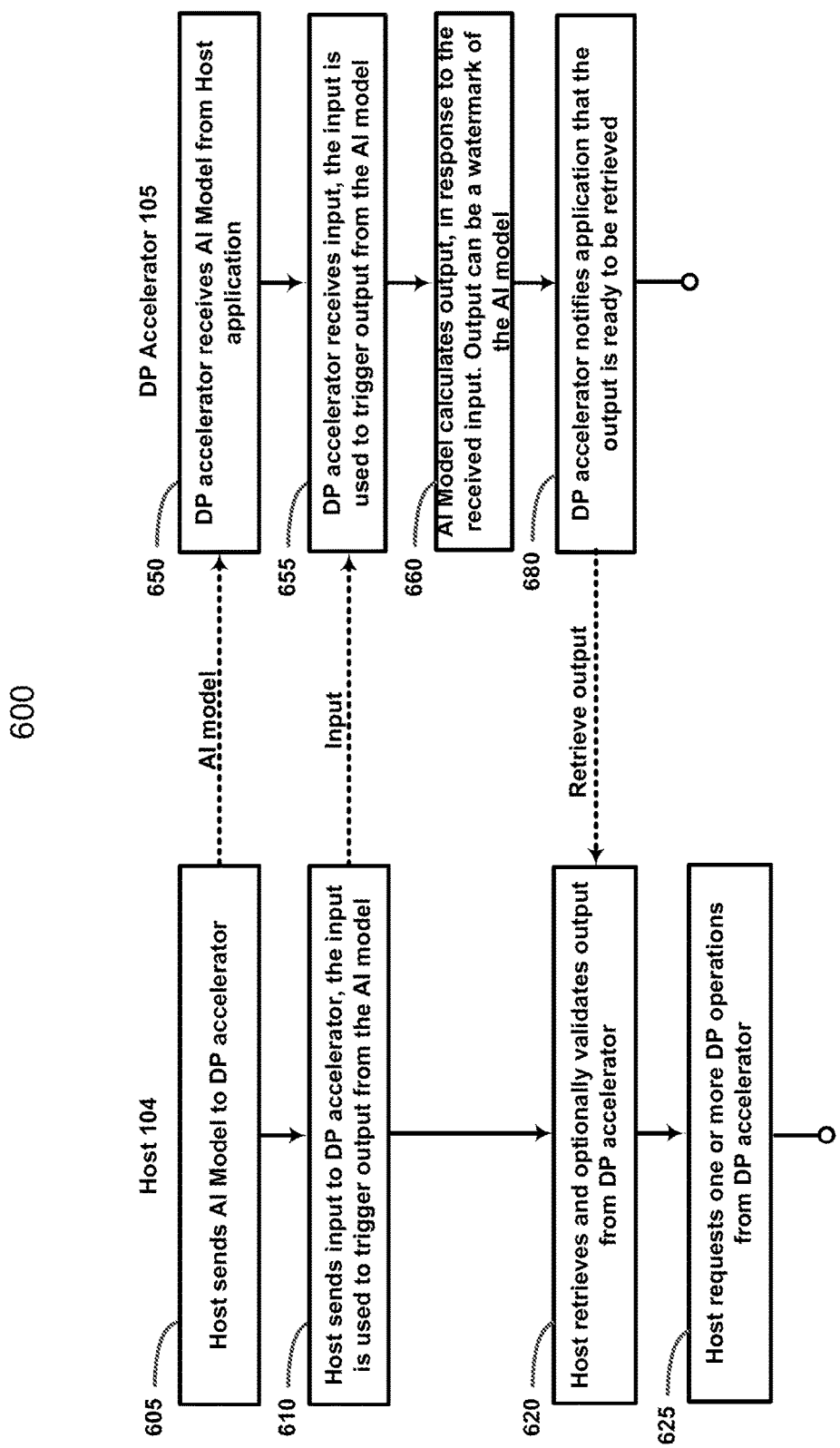
FIGS. 6A and 6B are block diagrams illustrating a method of securely digitally signing an AI watermark using implicit data, according to an embodiment.
Figure 6B:
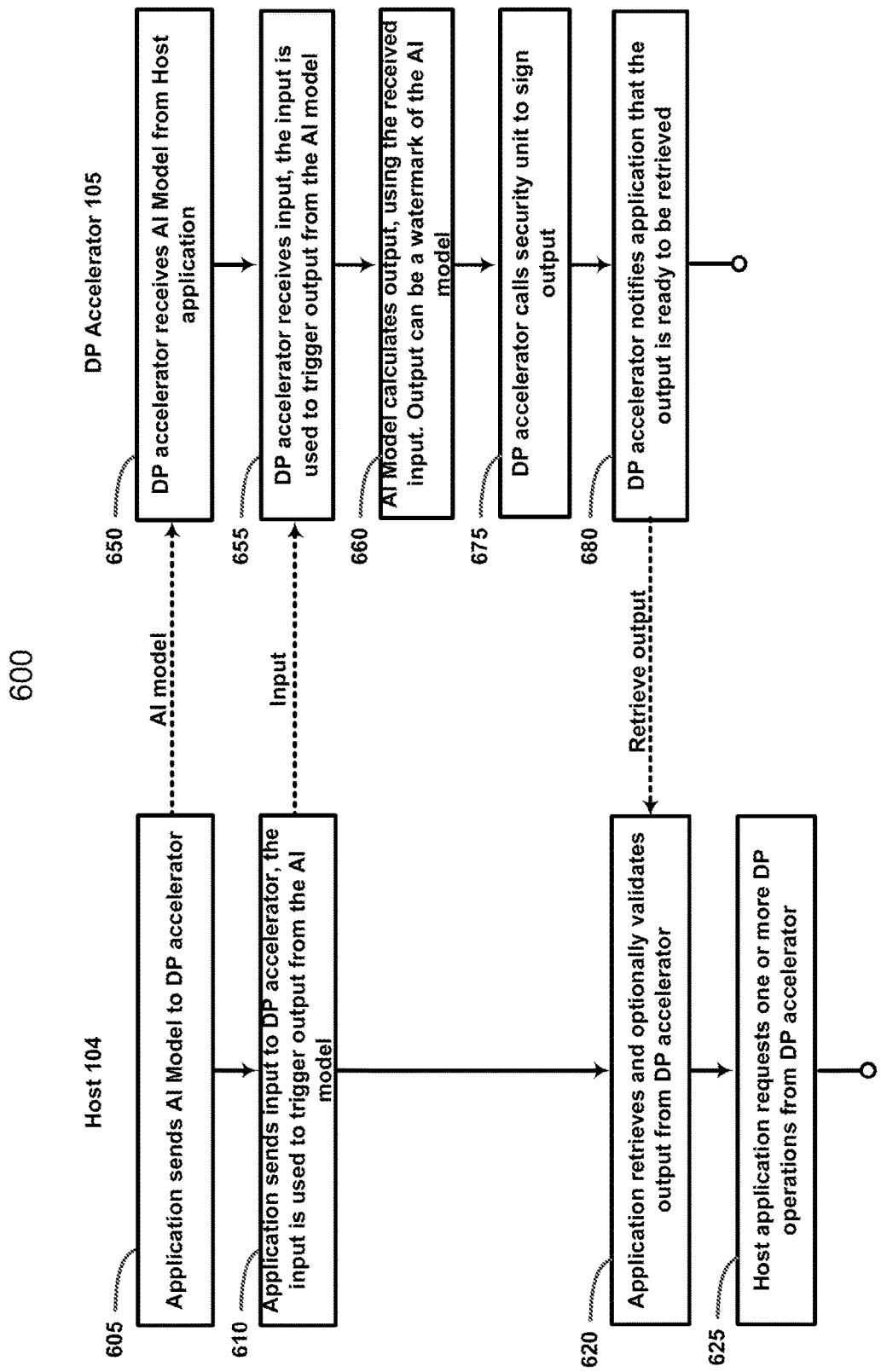

FIGS. 6A and 6B are block diagrams illustrating a method 600 of signing an AI watermark using implicit data, according to an embodiment. Referring now to FIG. 6A, in operation 605, an application on host device 104 can transmit an artificial intelligence (AI) model to the DP accelerator 105. In operation 650, the DP accelerator can receive the AI model from the host device 104.

In operation 610, the application on the host device 104 can transmit input to the DP accelerator that is used to trigger output from the AI model. In operation 655, DP accelerator 105 can receive the input data from the host device 104. In operation 660, DP accelerator 105 can run the AI model with the received input data to produce an output data. The output data can be a watermark of the AI model.

In operation 680, the DP accelerator can make the output data available to the host device 104 for retrieval. In operation 620, host device 104 can retrieve and, optionally, validate the output from the DP accelerator running the AI model with the input data. To validate the output data, host device 104 can run the AI model with the input data to obtain the watermark from the AI model, or otherwise obtain the watermark from a pre-existing source, and compare the obtained AI model watermark with the output data received from the DP accelerator 105. If the obtained watermark matches the output data received from DP accelerator 105, then the watermark is valid operation by the DP accelerator is valid.

In operation 625, host device 104 can request additional data processing operations from DP accelerator 105 using the AI model. In an embodiment, if the watermark was not validated, host 104 can opt to not make future calls to the DP accelerator 105 using method 600.

Referring now to FIG. 6B, in operation 605, an application on host device 104 can transmit an AI model to the DP accelerator 105. In operation 650, the DP accelerator can receive the AI model from the host device 104.

In operation 610, the application on the host device 104 can transmit input to the DP accelerator that is used to trigger output from the AI model. In operation 655, DP accelerator 105 can receive the input data from the host device 104.

In operation 660, DP accelerator 105 can run the AI model with the received input data to produce an output data. The output data can be a watermark of the AI model.

In operation 675, DP accelerator can call security unit 275 of DP accelerator 105 to digitally sign the output data (watermark). In an embodiment, digitally signing the watermark can include generating a hash or digest of the watermark, including the hash or digest in a packet with the watermark, and encrypting the packet with a private key of the DP accelerator.

In operation 680, the DP accelerator can make the digitally signed output data available to the host device 104 for retrieval. In operation 620, host device 104 can retrieve and, optionally, validate the output from the DP accelerator running the AI model with the input data, or otherwise obtaining the watermark from a pre-existing source. To validate the received, digitally signed output data, the host device can decrypt the received output using a public key of the DP accelerator 105 and extract the watermark and a hash or digest of the watermark. Host device 104 can compare the extracted watermark with the watermark obtained by the host device running the AI model with the input data. If they match, then host device 104 can also compute the hash or digest of the watermark and compare the computed hash or digest with the extracted hash or digest. If the hashes/digests match, then the DP accelerator 105 successfully extracted, and digitally signed, the watermark from the AI model using the input data.

In operation 625, host device 104 can request additional data processing operations from DP accelerator 105 using the AI model. In an embodiment, if the watermark was not validated, host 104 can opt to not make future calls for to DP accelerator 105 using method 600.

Figure 7:
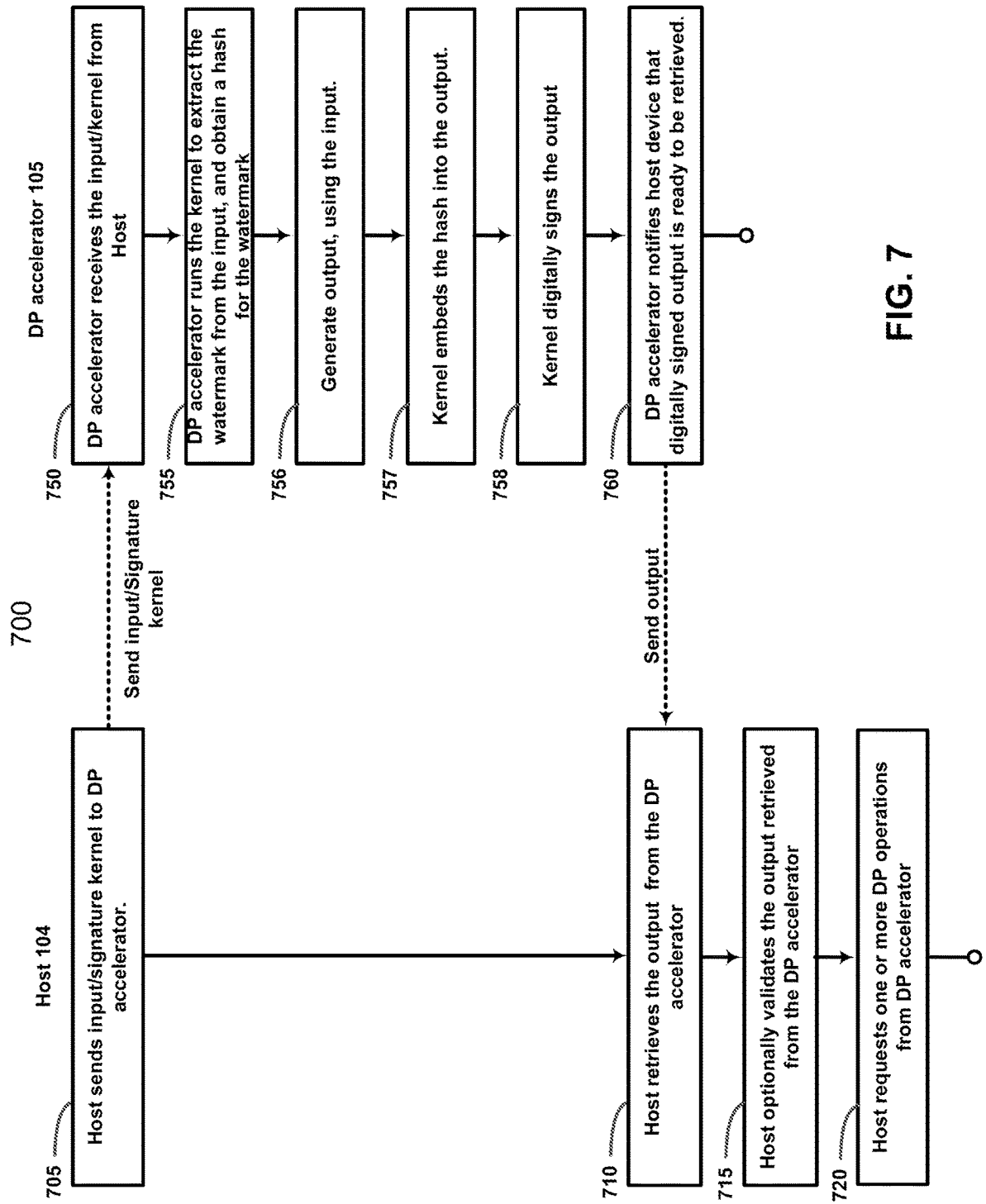
FIG. 7 is a block diagram illustrating a method of securely, digitally signing output using a host-provided kernel according to an embodiment.

FIG. 7 is a block diagram illustrating a method 700 of signing output using a host-provided signature kernel, according to an embodiment. In preparation for method 700, host device 104 and DP accelerator 105 can exchange one or more designated keys and establish a secure communication channel 215. Embodiments according to method 700 can use, as a DP accelerator 105, an accelerator such as Baidu® AI accelerator or other AI accelerator, or an accelerator such as a GPU.

In operation 705, an application on host device 104 can send a signature kernel to DP accelerator 105 over communication channel 215. In operation 750, DP accelerator 105 can receive the signature kernel from host device 150. The signature kernel specifies input data to access. The input data can be an AI model having a watermark. The signature kernel can generate output data, using the input.

In operation 755, DP accelerator runs the kernel to extract a watermark from the input data. The input data can be watermark-enabled AI model or data representing a watermark of an AI model. The signature kernel can access the specified input data from several difference sources. The source of the specified input data can be specified within the signature kernel, specified in a separate transmission from the host device 104 to the DP accelerator 105, or can be specified by reference, such as a pointer, or specified by reference to a register within the DP accelerator, e.g. "extract the watermark from the input data or data object specified in the DP accelerator register AX." The signature kernel can generate a hash, or digest, of the watermark using any known hash or digest technique.

In operation 756, the kernel generates output, using the input data, obtained as described above. In operation 757, the signature kernel can embed the hash or digest into the output data generated by the signature kernel. In operation 758, the kernel can digitally sign the output data. The signature can be generated using a key previously exchanged between the host device 104 and DP accelerator 105, or a private key of the DP accelerator 105.

In operation 760, DP accelerator 105 can notify host device 104 that the digitally signed output data is ready to be retrieved by host device 104. In operation 710, host device 104 can retrieve the output data from DP accelerator 105.

In operation 715, host device 104 can optionally validate the output data retrieved from DP accelerator 105. In an embodiment, validating the output can include an application on host device 104 performing operations 755 through 757, then decrypting the digital signature of the digitally signed output received from the DP accelerator, or otherwise obtaining the specified output from a pre-existing source, and comparing the result with the unsigned (after decrypting the signature) result generated by the DP accelerator. If the two match, then the DP accelerator 105 signature has been validated. In operation 720, host 104 can make one or more additional calls to the DP accelerator and signature kernel for additional operations. In an embodiment, if the signed output is not validated, then host 104 can opt to not make additional calls to DP accelerator 105 using method 700.

Figure 8:
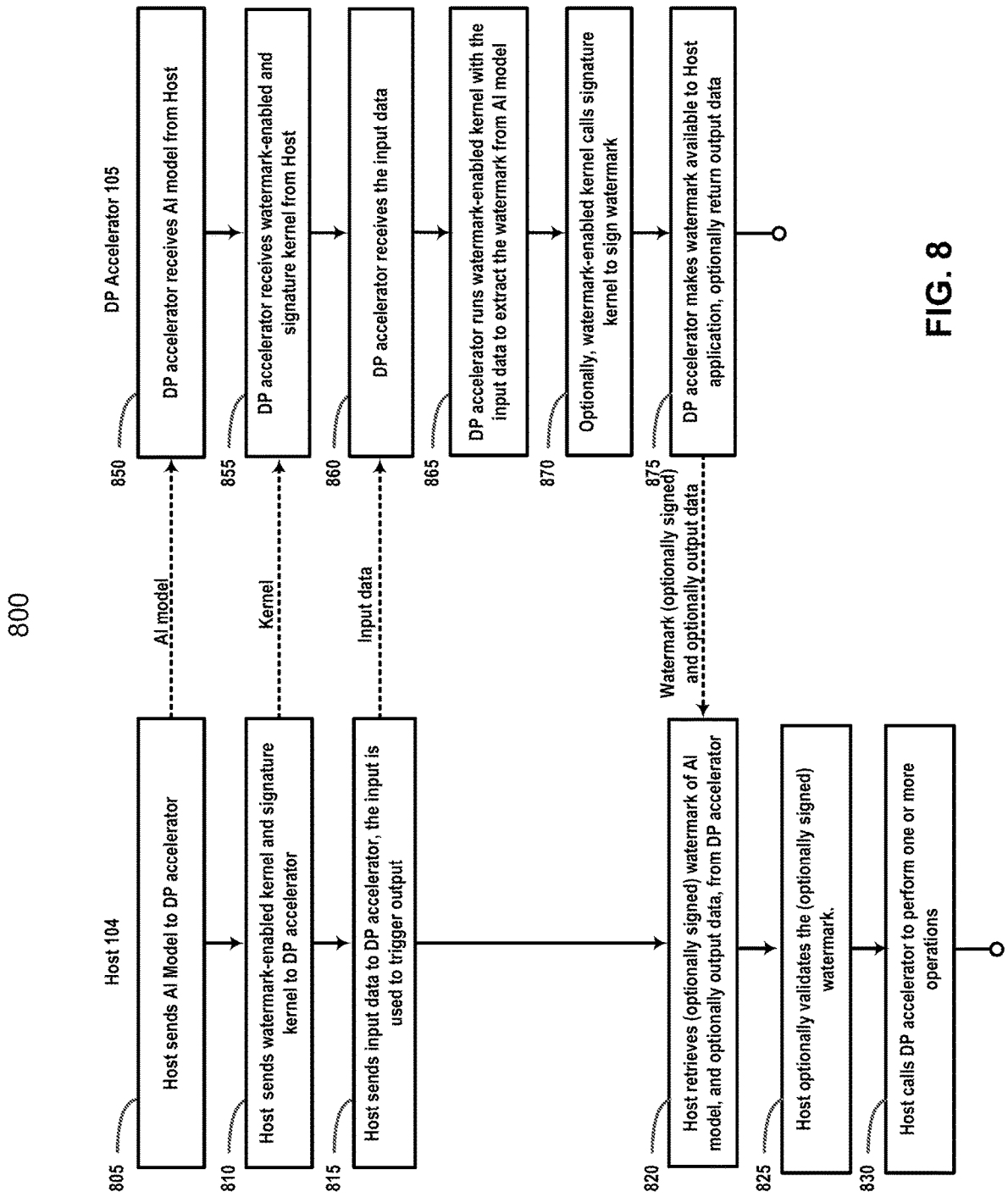
FIG. 8 is block diagram illustrating a method of securely, digitally signing a watermark of an AI model using a watermark-enabled and signature-enabled kernel provided by a host and an AI accelerator, according to an embodiment.

FIG. 8 is block diagram illustrating a method 800 of a DP accelerator digitally signing a watermark of an AI model using a watermark-enabled kernel and a signature kernel provided by a host device 104, according to an embodiment. In an embodiment, the watermark-enabled kernel and signature kernel can be integrated into a single kernel. Method 800 provides a generic AI watermark signature method to prove that an AI model having the watermark was used by DP accelerator 105. In preparation for method 800, host device 104 and DP accelerator 105 can exchange one or more designated keys and establish a communication channel 215 between the host device 104 and DP accelerator 105. In an embodiment, DP accelerator 105 can be an accelerator such as Baidu® AI accelerator or other AI accelerator, or an accelerator such as a graphics processing unit (GPU).

In operation 805, an application on host device 104 transmits a watermark-enabled AI model to DP accelerator 105 over communication channel 215. In operation 850, DP accelerator 105 receives the watermark-enabled AI model from host device 104. In operation 810, the application on host device 104 transmits a watermark-enabled kernel and a signature kernel to DP accelerator 105 over communication channel 215. In operation 855, DP accelerator 105 receives the watermark-enabled kernel and signature kernel from host device 104. In an embodiment, watermark-enabled kernel and signature kernel can be a single kernel combining the functionalities of each kernel.

In operation 815, the application on host device 104 transmits input data to the DP accelerator 105 over communication channel 215. The input data, when used as input to the watermark-enabled kernel, triggers the watermark-enabled kernel to output a watermark of the watermark-enabled AI model. In operation 860, DP accelerator 105 receives the input data from the host device 104.

In operation 865, the DP accelerator runs the watermark-enabled kernel, using the received input data as input, to extract the watermark from the watermark-enabled AI model received from the host device 104. In operation 870, in an embodiment, the watermark-enabled kernel can optionally call the signature kernel to digitally sign the watermark. In an embodiment, the digital signature includes a hash or digest of the watermark. In an embodiment, digitally signing the watermark includes the hash or digest of the watermark, and encrypting the watermark and hash/digest using a private key of the DP accelerator 105.

In operation 875, DP accelerator 105 notifies the host device 104 that the watermark (optionally digitally signed) is available for the host device 104 to retrieve. In operation 820, the application on host device 104 retrieves the (optionally digitally signed) watermark of the AI model from DP accelerator 105.

In operation 825, the host device 104 optionally validates the (e.g., optionally digitally signed) watermark. If the watermark was digitally signed by the signature kernel in operation 870, then the host device can decrypt the digital signature using a public key of the DP accelerator 105. The hash or digest of the watermark can be unpackaged from the decrypted output data. Host device 104 can run the watermark-enabled kernel to obtain the watermark from the watermark-enabled AI model, or otherwise obtain the watermark from a pre-existing source, and the host device 104 can compute the digest or hash of the watermark. If the host-computed or obtained watermark and hash match the DP accelerator-computed watermark and hash, then the DP accelerator, watermark-enabled kernel, and signature kernel outputs are validated.

In operation 830, host device 104 can call DP accelerator 105 to perform one or more such operations using the signature kernel and watermark-enabled kernel. In an embodiment, if the DP accelerator-produced watermark and digital signature are not validated then host device 104 can opt to not call DP accelerator 105 for further operations using the watermark enabled kernel and/or signature kernel.

Figure 9:
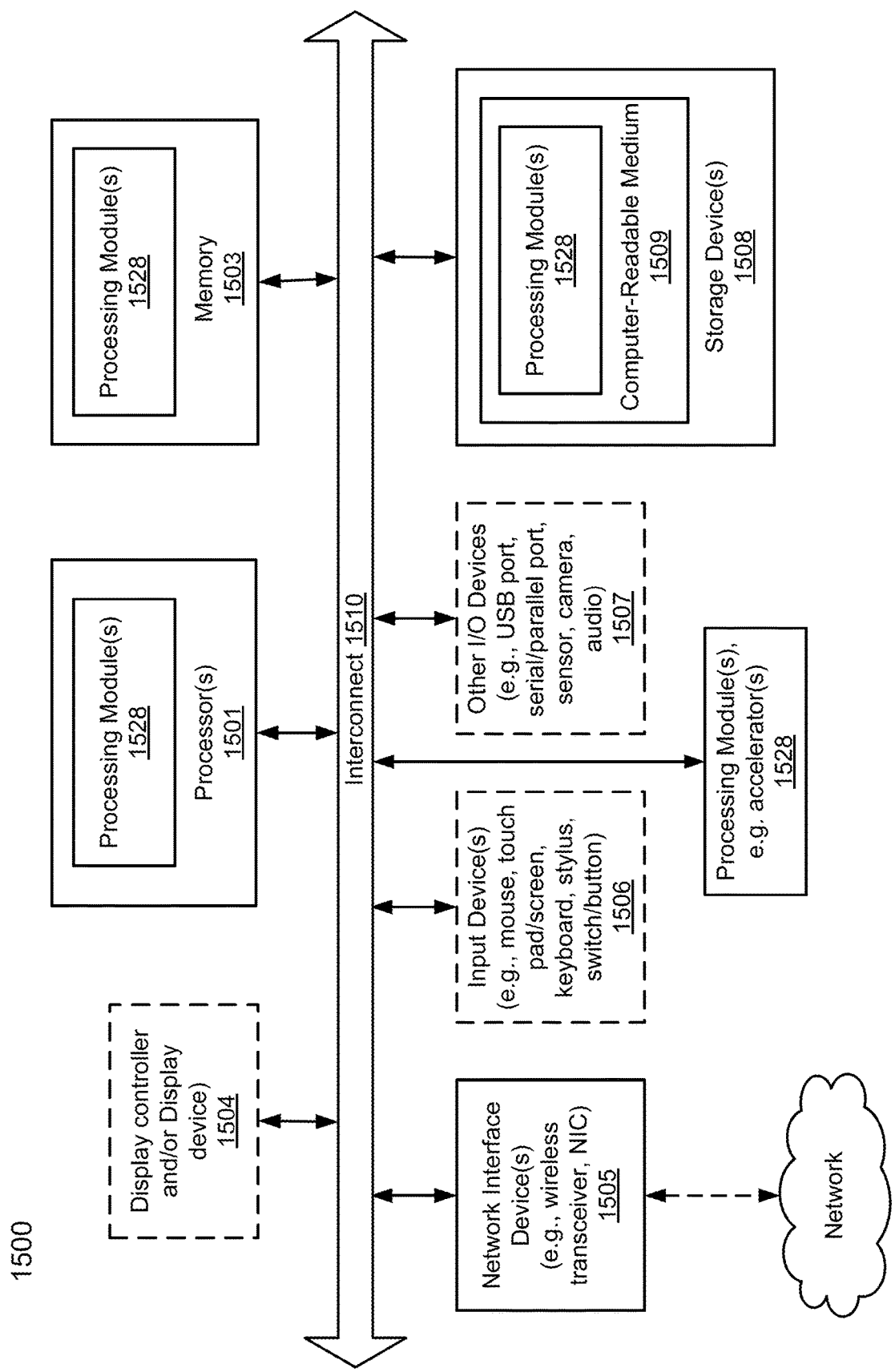
FIG. 9 is a block diagram illustrating an exemplary computing system for implementing the functionality disclosed herein.

FIG. 9 is a block diagram illustrating an example of a data processing system 1500 which may be used with one embodiment of the disclosure. For example, system 1500 may represent any of data processing systems described above performing any of the processes or methods described above, such as, for example, establishing secure communications between a host device 104 and data processing (DP) accelerator 105; running, by the DP accelerator, kernels of code of artificial intelligence (AI) models received from host device 104; executing applications on host device 104; executing API's and drivers on host device 104; running encryption/decryption logic, seed generators, encryption/decryption key generators, and the like, as described above for DP accelerator 105. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smart watch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as a Baidu® AI processor, a GPU, an ASIC, a cellular or baseband processor, an FPGA, a DSP, a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include JO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, user applications 205, runtime libraries 206, drivers 209 of host device 104, true random number generator 273, key manager 272, watermark unit 276, cryptographic engine 274 on DP accelerator 105. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some of the software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of a data processing (DP) accelerator encrypting or decrypting input data, the method comprising:
    receiving, from a host device, a command, the input data, a plurality of keys, and a kernel, wherein the kernel is an encryption or a decryption kernel provided to the DP accelerator, wherein a functionality of the DP accelerator is determined by a functionality type of the encryption kernel or the decryption kernel, wherein the functionality type of the kernel is not stored within a memory of the DP accelerator, wherein the plurality of keys include a symmetric key and an asymmetric key, wherein the symmetric key is used for communication sessions between the host device and the DP accelerator over a communication channel, and wherein the asymmetric key is used for encrypting and decrypting data and digital signatures;
    in response to the DP accelerator receiving the input data:
        extracting a watermark from a watermark-enabled artificial intelligence (AI) model by applying the watermark-enabled AI model to the input data to produce the watermark;
    in response to the DP accelerator receiving the command:
        encrypting by the DP accelerator the input data using the encryption kernel, in response to the command being "encrypt", and
        decrypting the input data using the decryption kernel in response to the command being "decrypt"; and
        transmitting the watermark, and the encrypted, or decrypted, input data to the host device.

2. The method of claim 1, wherein the DP accelerator is a general purpose processor or an artificial intelligence (AI) accelerator and the functionality type of the kernel is not stored within a memory of the DP accelerator, wherein the type of functionality of the kernel is encryption or decryption, and the method further comprising exchanging the one or more keys with the host device.

3. The method of claim 2, further comprising establishing a secure link between the host device and the DP accelerator using at least one of the one or more of the keys.

4. The method of claim 2, wherein at least one of the exchanged keys is the symmetric key, and the received kernel encrypts, or decrypts, the input data using the symmetric key.

5. The method of claim 2, wherein at least one of the one or more keys is retrieved from, or based on a key retrieved from, a secure storage of a security unit of the DP accelerator.

6. The method of claim 2, wherein the encryption, or decryption, is performed by the kernel using a key received from the host device.

7. A data processing (DP) accelerator, comprising:
    a non-transitory memory to store instruction to be executed by the DP accelerator;
    an interface to receive a command, the input data, a plurality of keys, and a kernel, wherein the kernel is an encryption or a decryption kernel from a host device, wherein the kernel is provided to the DP accelerator, wherein a functionality type of the DP accelerator is determined by a functionality type of the encryption kernel or the decryption kernel, wherein the functionality type of the kernel is not stored within a memory of the DP accelerator, wherein the plurality of keys include a symmetric key and an asymmetric key, wherein the symmetric key is used for communication sessions between the host device and the DP accelerator over a communication channel, and wherein the asymmetric key is used for encrypting and decrypting data and digital signatures; and
    a security unit, in response to the DP accelerator receiving the command, configured to
        extract a watermark from a watermark-enabled artificial intelligence (AI) model by applying the watermark-enabled AI model to the input data to produce the watermark,
        encrypt the input data using the encryption kernel, in response to the command being "encrypt", and
        decrypt the input data using the decryption kernel in response to the command being "decrypt", and
        transmit the watermark, and the encrypted or decrypted input data to the host device.

8. The DP accelerator of claim 7, wherein the DP accelerator is a general purpose processor or an artificial intelligence (AI) accelerator and the functionality type of the kernel is not stored within a memory of the DP accelerator, wherein the type of functionality of the kernel is encryption or decryption, and
    wherein the security unit comprises a key manager to exchange one or more keys with the host device.

9. The DP accelerator of claim 8, further comprising a channel manager configured to establish a secure link between the host device and the DP accelerator using at least one of the one or more of the keys.

10. The DP accelerator of claim 8, wherein at least one of the exchanged keys is the symmetric key, and the received kernel encrypts, or decrypts, the input data using the symmetric key.

11. The DP accelerator of claim 8, wherein at least one of the one or more keys is retrieved from, or based on a key retrieved from, a secure storage of a security unit of the DP accelerator.

12. The DP accelerator of claim 8, wherein the encryption, or decryption, is performed by the kernel using a key received from the host device.

13. A non-transitory machine-readable medium having instructions stored therein, which when executed by a data processing (DP) accelerator, cause the DP accelerator to perform operations, the operations comprising:
   receiving, from a host device, a command, the input data, a plurality of keys, and a kernel, wherein the kernel is an encryption or a decryption kernel provided to the DP accelerator, wherein a functionality type of the DP accelerator is determined by a functionality type of the encryption kernel or the decryption kernel, wherein the functionality type of the kernel is not stored within a memory of the DP accelerator, wherein the plurality of keys include a symmetric key and an asymmetric key, and wherein the symmetric key is used for communication sessions between the host device and the DP accelerator over a communication channel, and wherein the asymmetric key is used for encrypting and decrypting data and digital signatures;
   in response to the DP accelerator receiving the input data:
      extracting a watermark from a watermark-enabled artificial intelligence (AI) model by applying the watermark-enabled AI model to the input data to produce the watermark;
   in response to the DP accelerator receiving the command:
      encrypting by the DP accelerator the input data using the encryption kernel, in response to the command being "encrypt",
      decrypting the input data using the decryption kernel in response to the command being "decrypt"; and
   transmitting the watermark, and the encrypted, or decrypted, input data to the host device.

14. The machine-readable medium of claim 13, wherein the DP accelerator is a general purpose processor or an artificial intelligence (AI) accelerator and the functionality type of the kernel is not stored within a memory of the DP accelerator, wherein the type of functionality of the kernel is encryption or decryption, and wherein the operations further comprise exchanging one or more keys with the host device.

15. The machine-readable medium of claim 14, wherein the operations further comprise establishing a secure link between the host device and the DP accelerator using at least one of the one or more of the keys.

16. The machine-readable medium of claim 14, wherein at least one of the exchanged keys is the symmetric key, and the received kernel encrypts, or decrypts, the input data using the symmetric key.

17. The machine-readable medium of claim 14, wherein at least one of the one or more keys is retrieved from, or based on a key retrieved from, a secure storage of a security unit of the DP accelerator.

18. A host device, comprising:
   a processor; and
   a memory coupled to the processor to store instructions, which when executed by the processor, cause the processor to perform operations, the operations comprising:
      transmitting, by the host device, to a DP accelerator, a command, the input data, a plurality of keys, and a kernel, wherein the kernel is an encryption or a decryption kernel provided to the DP accelerator, wherein a functionality of the DP accelerator is determined by a functionality type of the encryption kernel or the decryption kernel, wherein the functionality type of the kernel is not stored within a memory of the DP accelerator, wherein the plurality of keys include a symmetric key and an asymmetric key, wherein the symmetric key is used for communication sessions between the host device and the DP accelerator over a communication channel, wherein the asymmetric key is used for encrypting and decrypting data and digital signatures, wherein the command is either an encryption command or a decryption command, wherein the DP accelerator is a general purpose processor or an artificial intelligence (AI) processor, wherein a watermark is extracted from a watermark-enabled AI model by applying the watermark-enabled AI model to the input data to produce the watermark, and
      obtaining, by the host device, from the DP accelerator, the watermark, and the encrypted or decrypted input data, wherein the DP accelerator encrypts or decrypts the input data using the kernel in response to the command.

19. The host device of claim 18, wherein the operations further comprise:
   exchanging one or more keys with the DP accelerator; and
   establishing a secure link between the host device and DP accelerator, using at least one of the one or more keys.

20. The host device of claim 19, wherein at least one of the one or more keys is the symmetric key.

* * * * *